(12) United States Patent
Britto et al.

(10) Patent No.: US 8,178,743 B2
(45) Date of Patent: May 15, 2012

(54) METHOD OF CHEMICAL TREATMENT OF SOILS CONTAINING HAZARDOUS SUBSTANCES SUSCEPTIBLE TO NUCLEOPHILLIC ATTACK

(75) Inventors: Ronald Britto, Collierville, TN (US); Madhukant Patel, Cordova, TN (US); Mikael L. Spangberg, West Hartford, CT (US); Richard W. Arnseth, Knoxville, TN (US); Franklin R. Bogle, Knoxville, TN (US)

(73) Assignee: Tetra Tech, Inc., Pasadena, CA (US)

( * ) Notice: Subject to any disclaimer, the term of this patent is extended or adjusted under 35 U.S.C. 154(b) by 220 days.

(21) Appl. No.: 12/495,430

(22) Filed: Jun. 30, 2009

(65) Prior Publication Data
US 2010/0069702 A1    Mar. 18, 2010

Related U.S. Application Data

(60) Provisional application No. 61/077,042, filed on Jun. 30, 2008.

(51) Int. Cl.
*A62D 3/36*    (2007.01)
*A62D 101/06*    (2007.01)

(52) U.S. Cl. ......................................... 588/318; 588/403

(58) Field of Classification Search ........................ None
See application file for complete search history.

(56) References Cited

U.S. PATENT DOCUMENTS

| | | | |
|---|---|---|---|
| 5,124,051 A | 6/1992 | Bircher et al. | |
| 5,538,530 A * | 7/1996 | Heaton et al. | ..................... 71/24 |
| 5,626,437 A | 5/1997 | Hunt et al. | |
| 5,631,160 A | 5/1997 | Bruso | |
| 5,829,918 A | 11/1998 | Chintis | |
| 5,908,267 A | 6/1999 | Schuring et al. | |
| 6,210,078 B1 | 4/2001 | Redwine et al. | |
| 6,388,164 B1 | 5/2002 | Desmare et al. | |
| 6,398,960 B1 | 6/2002 | Borden et al. | |
| 6,416,250 B1 | 7/2002 | Gilmore et al. | |
| 6,464,005 B1 | 10/2002 | Ellis | |
| 7,056,060 B2 | 6/2006 | Abouodah | |
| 7,270,499 B2 | 9/2007 | Greenberg | |

(Continued)

FOREIGN PATENT DOCUMENTS

WO    92/09532    6/1992

OTHER PUBLICATIONS

Committee on Technologies for Cleanup of Subsurface Contaminants in the DOE Weapons Complex, National Research Council, Groundwater and Soil Cleanup: Improving Management of Persistent Contaminants, The National Academies Press, 1999, pp. 114-116.*

(Continued)

*Primary Examiner* — Stanley Silverman
*Assistant Examiner* — Justin Bova
(74) *Attorney, Agent, or Firm* — Luedeka Neely Group, P. C.

(57) ABSTRACT

A method for remediating hazardous materials susceptible to nucleophillic attack is disclosed wherein sodium hydroxide is applied to a treatment zone in situ for raising the pH of the treatment zone to at least about 12.5 so that alkaline hydrolysis effectively breaks down the hazardous substance by replacing a leaving group with a nucleophile. The method is well suited for in situ use in the vadose zone to treat contaminated soil and groundwater.

20 Claims, 30 Drawing Sheets

Bench-scale Set-up Summary

| Bench Scale Trials | Start Date | Chemicals Added to Tests | | | | |
|---|---|---|---|---|---|---|
| | | Lime (oz) | $CaO_2$ (fl oz) | NaOH (oz) | $FeCl_3$ (ml) | $H_2O_2$ (ml) |
| BS1 | 26-Jun-07 | 22 | - | 8 | - | - |
| BS2 | 26-Jun-07 | 2 | 8 | - | - | - |
| BS3 | 26-Jun-07 | 16 | 8 | - | - | - |
| BS4 | 26-Jun-07 | 16 | 1.5 | - | - | - |
| BS5 | 26-Jun-07 | - | 16 | 8 | 250 | - |
| BS6 | 10-Jul-07 | - | - | 16 | - | - |
| BS7 | 10-Jul-07 | - | - | 10 | 200 | - |
| BS8 | 10-Jul-07 | - | - | 10 | 100 | - |
| BS9 | 10-Jul-07 | 16 | 10 | 8 | 150 | 100 |

Note:

Water has been added to each of the experiment
- = the chemical has not been added to that trial oz = Ounce
ml = milli liter
$CaO_2$ – Calcium Peroxide
NaOH – Sodium Hydroxide
$H_2O_2$ – Hydrogen Peroxide (34%)

U.S. PATENT DOCUMENTS

2002/0156336 A1  10/2002  Pak
2004/0073077 A1*  4/2004  Kornel .................. 588/203
2007/0280785 A1  12/2007  Block et al.

OTHER PUBLICATIONS

Emmrich, Kinetics of the Alkaline Hydrolysis of 2,4,6-Trinitrotoluene in Aqueous Solution and Highly Contaminated Soils, Environmental Science & Technology 1999, vol. 33 No. 21, pp. 3802-3805.
Mills et al., Alkaline Hydrolysis of Trinitrotoluene, TNT, Phys. Chem. Chem. Phys., 2003, vol. 5, pp. 3921-3927.
Emmrich, Kinetics of the Alkaline Hydrolysis of Important Nitroaromatic Co-contaminants of 2,4,6-Trinitrotoluene in Highly Contaminated Soils, Environmental Science & Technology 2001, vol. 35 No. 5, pp. 874-877.
Tetra Tech Inc., Draft Summary Bench Scale and Field Treatability Tests Chemical Treatment of TNT and DNT-Contaminated Soil, TNT Manufacturing Valley Volunteer Army Ammunition Plant, Aug. 31, 2007.
The Interstate Technology & Regulatory Council, In Situ Chemical Oxidation Team, Technical and Regulatory Guidance for In Situ Chemical Oxidation of Contaminated Soil and Ground Water, Second Edition, Jan. 2005.
Brooks et al., Topical Lime Treatment for Containment of Source Zone Energetics Contamination, Environmental Laboratory, Sep. 2003.
Davis et al., Effect of Treatment pH on the End Products of the Alkaline Hydrolysis of TNT and RDX, Environmental Laboratory, Jun. 2007.
Santiago et al., Chemical Remediation of an Ordnance-Related Compound: The Alkaline Hydrolysis of CL-20, Environmental Laboratory, Sep. 2007.
Hansen et al., Base-Induced 2,4,6-Trinitrotoluene Transformation, Titration Studies, Engineer Research and Development Center, Aug. 2001.
Thorne et al., Continuous Treatment of Low Levels of TNT and RDX in Range Soils Using Surface Liming, Cold Regions Research and Engineering Laboratory, Feb. 2004.
Hwang et al., High Explosives Alkaline Hydrolysis in Continuous Stirred Tank Reactor, Breaking Frontiers and Barriers in Engineering: Education, Research and Practice, Jun. 2006, pp. 1-10.
Thorn et al., $^{15}N$ NMR Investigation of the Covalent Binding of Reduced TNT Amines to Soil Humic Acid, Model Compounds, and Lignocellulose, Environ. Sci. Technol., 2002, vol. 36, pp. 3787-3796.
Arienzo, Degradation of 2, 4, 6-trinitrotoluene in water and soil slurry utilizing a calcium peroxide compound, ScienceDirect—Chemosphere, 1999, pp. 1-7.
Medina et al., Evaluation of Lime and Persulfate Treatment for Mixed Contaminant Soil From Plum Brook Ordnance Works (Sandusky, OH), Environmental Laboratory, US Army Corps of Engineers, Engineer Research and Development Center, Sep. 2007, pp. 1-116.
Hwang et al., Alkaline Hydrolysis is an Effective Treatment Technology for RDX-Contaminated Groundwater, Department of Geography and Environmental Engineering, Johns Hopkins University, pp. 1-4.
Tetra Tech Inc., RCRA Corrective Measures Study Bench-Scale Treatability Study Work Plan for the North and South TNT Manufacturing Valley Groundwater Investigation, Jan. 25, 2008, pp. 1-204.
Mirecki et al., Environmental Transport and Fate Process Descriptors for Propellant Compounds, Environmental Laboratory, US Army Corps of Engineers, Engineer Research and Development Center, Jun. 2006, pp. 1-70.
Davis et al., Engineering Considerations for Hydroxide Treatment of Training Ranges, Environmental Laboratory, US Army Corps of Engineers, Engineer Research and Development Center, Jun. 2007, pp. 1-99.
Thorn et al., Alkaline Hydrolysis/Polymerization of 2,4,6-trinitrotoluene: Characterization of Products by $^{13}C$ and $^{15}N$ NMR, Environ. Sci. Technol., 2004, vol. 38, pp. 2224-2231.

\* cited by examiner

FIG. 1

Bench-scale Set-up Summary

| Bench Scale Trials | Start Date | Lime (oz) | $CaO_2$ (fl oz) | NaOH (oz) | $FeCl_3$ (ml) | $H_2O_2$ (ml) |
|---|---|---|---|---|---|---|
| BS1 | 26-Jun-07 | 22 | - | 8 | - | - |
| BS2 | 26-Jun-07 | 2 | 8 | - | - | - |
| BS3 | 26-Jun-07 | 16 | 8 | - | - | - |
| BS4 | 26-Jun-07 | 16 | 1.5 | - | - | - |
| BS5 | 26-Jun-07 | - | 16 | 8 | 250 | - |
| BS6 | 10-Jul-07 | - | - | 16 | - | - |
| BS7 | 10-Jul-07 | - | - | 10 | 200 | - |
| BS8 | 10-Jul-07 | - | - | 10 | 100 | - |
| BS9 | 10-Jul-07 | 16 | 10 | 8 | 150 | 100 |

Note:

Water has been added to each of the experiment

- = the chemical has not been added to that trial oz = Ounce
ml = milli liter
$CaO_2$ – Calcium Peroxide
NaOH – Sodium Hydroxide
$H_2O_2$ – Hydrogen Peroxide (34%)

FIG. 2

Sampling and Analytical Protocol

| Sampling Dates | Sampled Bench Scale Trials | Analytes | | | |
|---|---|---|---|---|---|
| | | pH | Nitrate-N | Nitrite-N | Explosives |
| | | Analytical Method | | | |
| | | SW9040 | E300 | E300 | SW8330B |
| 6/26/07 | BSH, BS1 through BS5 | X | X | X | |
| 6/28/07 | BS1 through BS5 | X | X | X | X |
| 6/29/07 | BS1 through BS5 | X | X | X | X |
| 7/05/07 | BS1 through BS5 | X | X | X | X |
| 7/16/07 | BS1, BS5, BS6, BS7, BS8 and BS9 | X | X | X | X |
| 7/17/07 | BS2, BS3 and BS4 | | | | X |
| 7/30/07 | BS1 through BS9 | X | X | X | X |

Note:
BSH – Baseline Homogenized Soil

FIG. 9

Sampling and Analytical Protocol

| Sampling Dates | Sampled Bench Scale Trials | Analytes | | | | | |
|---|---|---|---|---|---|---|---|
| | | Explosives | % solids | Nitrate | Nitrite | pH | TOC |
| | | Analytical Method | | | | | |
| | | SW8330B | 2540 | E 300 | E 300 | 9045B | 9060A modified |
| 9/27/2007 | BSH | X | | | | | |
| 10/8/2007 | BS-A, BS-B | X | X | X | X | | |
| 10/22/2007 | BS-A, BS-B | X | X | X | X | X | X |
| 11/2/2007 | BS-A, BS-B | | X | X | X | X | X |
| 11/8/2007 | BS-A, BS-B | | X | X | X | X | X |
| 11/28/2007 | BS-A, BS-B | | X | X | X | X | X |

FIG. 11

| Sampling and Analytical Protocol | | | | | | | |
|---|---|---|---|---|---|---|---|
| | Sampled Bench Scale Trials | Analytes | | | | | |
| | | Explosives | % solids | Nitrate | Nitrite | pH | TOC |
| | | Analytical Method | | | | | |
| Sampling Dates | | SW8330B | 2540 | E 300 | E 300 | 9045B | 9060A modified |
| 9/27/2007 | BSH | X | | | | | |
| 10/8/2007 | BS-A, BS-B | X | X | X | X | | X |
| 10/22/2007 | BS-A, BS-B | X | X | X | X | X | X |
| 11/2/2007 | BS-A, BS-B | | X | X | X | X | X |
| 11/8/2007 | BS-A, BS-B | | X | X | X | X | X |
| 11/28/2007 | BS-A, BS-B | | X | X | X | X | X |

FIG. 20

Comparison of ChemBatch Treatments

|  | t = 0 Total Explosives in soil (mg/kg) | T = 72 hours Total Explosives in soil (mg/kg) | Change after 72 hours |
|---|---|---|---|
| *No Treatment Control* | 2472 | 2419 | -2.1% |
| *1.0 mM NaOH* | 2472 | 2301 | -6.9% |
| *1.9 mM NaOH* | 2472 | 2202 | -10.9% |
| *6.7 mM NaOH* | 2472 | 2221 | -10.1% |
| *19 mM NaOH* | 2472 | 1324 | -46.4% |
| *50 mM NaOH* | 2472 | 27 | -98.9% |
| *100 mM NaOH* | 2472 | 15 | -99.4% |
| *Ozone* | 2472 | 715 | -71.1% |
| *Ozone & 19 mM NaOH* | 2472 | 301 | -87.8% |
| *Sodium Persulfate* | 2472 | 2062 | -16.6% |
| *Modified Fenton's R.* | 2472 | 1431 | -42.1% |

FIG. 21

Influence of NaOH Concentration and pH

| Initial NaOH Concentration | pH at t = 0.25 hours | pH at 72 hours |
|---|---|---|
| 0 (background) | 6.59 | 6.59 (assumed) |
| 1.0 mM | 8.55 | 7.51 |
| 1.9 mM | 8.42 | 7.44 |
| 6.7 mM | 8.85 | 7.57 |
| 19 mM | 9.93 | 8.16 |
| 50 mM | 11.15 | 12.57 |
| 100 mM | 11.84 | 13.53 |

METHOD OF CHEMICAL TREATMENT OF SOILS CONTAINING HAZARDOUS SUBSTANCES SUSCEPTIBLE TO NUCLEOPHILLIC ATTACK

CROSS-REFERENCE(S) TO RELATED APPLICATION(S)

This application claims priority to U.S. Provisional Application Ser. No. 61/077,042 originally filed on Jun. 30, 2008, entitled METHOD OF CHEMICAL TREATMENT OF SOILS CONTAINING NITROAROMATIC COMPOUNDS, the content of which is incorporated herein by reference in its entirety.

STATEMENT AS TO INVENTION RIGHTS UNDER FEDERALLY SPONSORED RESEARCH

This disclosure arose in the performance of Contract Nos. W9128F-04-D-0027 (Task Order CK01), FA 4890-04-D-0006 (Task Order CK11), and FA 4890-04-D-0006 (Task Order CK12) between Tetra Tech, Inc. and the U.S. Army Corps Of Engineers. The government may have certain rights in the embodiments of the invention described herein.

FIELD

This disclosure relates to the field of environmental remediation. More particularly, this disclosure relates to alkaline hydrolysis treatment for media contaminated by hazardous substances.

BACKGROUND

Hazardous materials are prevalent all over the globe, and new techniques to effectively, efficiently, and relatively safely remediate or otherwise neutralize such materials are continually sought by environmental agencies, both governmental and private. Certain types of hazardous materials only respond to specific types of treatments, and it is rare to find a particular treatment regime capable of effectively and efficiently remediating an entire category of hazardous materials. The category of nitroaromatic compounds is an example of hazardous substances that are prevalent in soil, water, and other media, and some of the members of this category are particularly recalcitrant to remediation efforts. There are many dangers associated with nitroaromatic compounds including their tendency to detonate and their classification as carcinogens. 2,4,6-Trinitrotoluene ("TNT") is perhaps the most well-known nitroaromatic compound, and there is a significant amount of TNT and other related nitroaromatic munitions materials (e.g., DNT, RDX) contaminating soils all around the world. Many remediation technologies have been used or otherwise considered over the years to clean up TNT and other nitroaromatic compounds, but, as of yet, no treatment has demonstrated an effectiveness in practice for efficiently treating TNT, DNT, and other nitroaromatic compounds.

What is needed, therefore, is a method for effectively treating soil and other media contaminated with organic explosives and other recalcitrant compounds such as pesticides and chlorinated solvents wherein such treatment method is capable of altering concentrations of such compounds to acceptable target level concentrations.

SUMMARY

The above and other needs are met by a method of treating a medium in situ, the medium contaminated with one or more hazardous substances, the method including the step of applying a treatment composition to a treatment zone containing a hazardous substance until the average pH of the treatment zone is greater than about 12.0 at or about at which the hazardous substance is susceptible to nucleophillic attack, wherein the treatment composition includes at least 40% by weight a metal hydroxide selected from the group consisting of sodium hydroxide and potassium hydroxide and mixtures thereof, and wherein at least 90% (wt) of the hazardous substance is broken down into less hazardous materials. In one embodiment, the treatment composition essentially consists of a metal hydroxide selected from the group consisting of sodium hydroxide and potassium hydroxide and mixtures thereof. In a preferred embodiment, the medium includes soil.

In a related embodiment, the hazardous substance includes a substance selected from the group consisting of trinitrotoluene ("TNT"), 2,4-dinitrotoluene (DNT1), 2,6-dinitrotoluene ("DNT2"), royal demolition explosive ("RDX"), and Lindane (gamma-GHC).

In another related embodiment, the hazardous substance comprises a substance including (a) one or more type of alkane; (b) one or more type of alkene; (c) one or more type of substituted aromatic substance; (d) one or more type of substituted heterocyclic substance; (e) a mixture including (a) and (b); a mixture including (a) and (c); a mixture including (a) and (d); a mixture including (b) and (c); a mixture including (b) and (d); a mixture including (c) and (d); a mixture including (a), (b), and (c); a mixture including (b), (c), and (d); a mixture including (a), (c), and (d); a mixture including (a), (b), and (d); or a mixture including (a), (b), (c), and (d). In one embodiment, the one or more type of substituted aromatic substance includes at least one functional group selected from a carboxylate group, a phosphate group, a nitrogen group, a methyl group or a sulfonic group. In another embodiment, the one or more type of substituted heterocyclic substance includes at least one functional group selected from a carboxylate group, a phosphate group, a nitrogen group, a methyl group or a sulfonic group. In a specific embodiment, the one or more type of substituted aromatic substance is selected from TNT, DNT1, or DNT2. In another specific embodiment, the one or more type of substituted heterocyclic substance is selected from Lindane (gamma-GHC) or RDX.

In another related embodiment, the step of applying a treatment composition to a treatment zone containing a hazardous substance until the average pH of the treatment zone is greater than about 12.0 is extended until the average pH of the treatment zone ranges from about 12.5 to about 13.5. In a more specific embodiment, the step of applying a treatment composition to a treatment zone containing a hazardous substance until the average pH of the treatment zone is greater than about 12.0 is prolonged until the average pH of the treatment zone is greater than or equal to about 13.0.

In another aspect, embodiments of the disclosure provide a method of treating a subsurface area contaminated with hazardous material including distributing a treatment composition into a treatment zone located within a treatment domain, in situ, wherein the treatment composition includes a mixture including an alkali treatment agent selected from sodium hydroxide, potassium hydroxide, or mixtures thereof, wherein the resultant concentration from distribution is sufficient to cause the treatment zone to exhibit an average pH level of at least about 11.0, causing the alkali treatment agent to contact the hazardous material in the treatment zone for a time and under conditions sufficient to breakdown at least about 90% of the hazardous material by an alkaline hydrolysis reaction. The subsurface area is preferably selected from the vadose zone, the saturated zone, the water table or one or more thereof.

In a preferred embodiment, the mixture of the treatment composition further includes an aqueous mixture including an alkali treatment agent selected from sodium hydroxide, potassium hydroxide, or mixtures thereof. Preferably, at least one of the hazardous materials in the treatment zone are susceptible to nucleophillic attack at an average pH level of at least about 11.0, more preferably at least about 12.0, still more preferably at least about 12.5, and most preferably at least about 13.0. The hazardous materials are preferably selected from (a) one or more type of alkane; (b) one or more type of alkene; (c) one or more type of substituted aromatic substance; (d) one or more type of substituted heterocyclic substance; (e) a mixture including (a) and (b); a mixture including (a) and (c); a mixture including (a) and (d); a mixture including (b) and (c); a mixture including (b) and (d); a mixture including (c) and (d); a mixture including (a), (b), and (c); a mixture including (b), (c), and (d); a mixture including (a), (c), and (d); a mixture including (a), (b), and (d); or a mixture including (a), (b), (c), and (d).

In a related embodiment the distribution step further includes injecting the aqueous treatment composition into the treatment zone in a manner selected from a vertical injection well, a horizontal injection well, a trench, or combinations thereof, if the treatment zone primarily includes saturated soil; and injecting the aqueous treatment composition into the treatment zone in a manner selected from mixing in place, an infiltration gallery, a vertical injection well, or combinations thereof, if the treatment zone primarily includes unsaturated soil. In another related embodiment, the distribution step further includes injecting the aqueous treatment composition into the treatment domain in a manner selected from vertical injection wells, horizontal injection wells, trenches, or combinations thereof, if the treatment zone primarily includes saturated soil; and injecting the aqueous treatment composition into the treatment domain in a manner selected from mixing in place, an infiltration gallery, vertical injection wells, or combinations thereof, if the treatment zone is primarily unsaturated soil.

BRIEF DESCRIPTION OF THE DRAWINGS

Further features, aspects, and advantages of the present invention will become better understood by reference to the following detailed description, appended claims, and accompanying figures, wherein elements are not to scale so as to more clearly show the details, wherein like reference numbers indicate like elements throughout the several views, and wherein:

FIG. 1 shows a table summarizing the bench scale set up and various trials of an embodiment of the method disclosed herein;

FIG. 2 shows a table summarizing sampling and analytical protocol for an embodiment of the method disclosed herein;

FIG. 9 shows a table representing a summary of degradation rate information for various trials in a bench scale study;

FIG. 11 shows a table summarizing sampling and analytical protocol for an embodiment of the method disclosed herein;

FIG. 20 shows a summary table indicating the overall comparative results of the batch test runs referred to in FIGS. 14-19;

FIG. 21 shows a table revealing the influence of the concentration of sodium hydroxide on the batch test runs of FIGS. 14-19;

DETAILED DESCRIPTION

Figure 3:
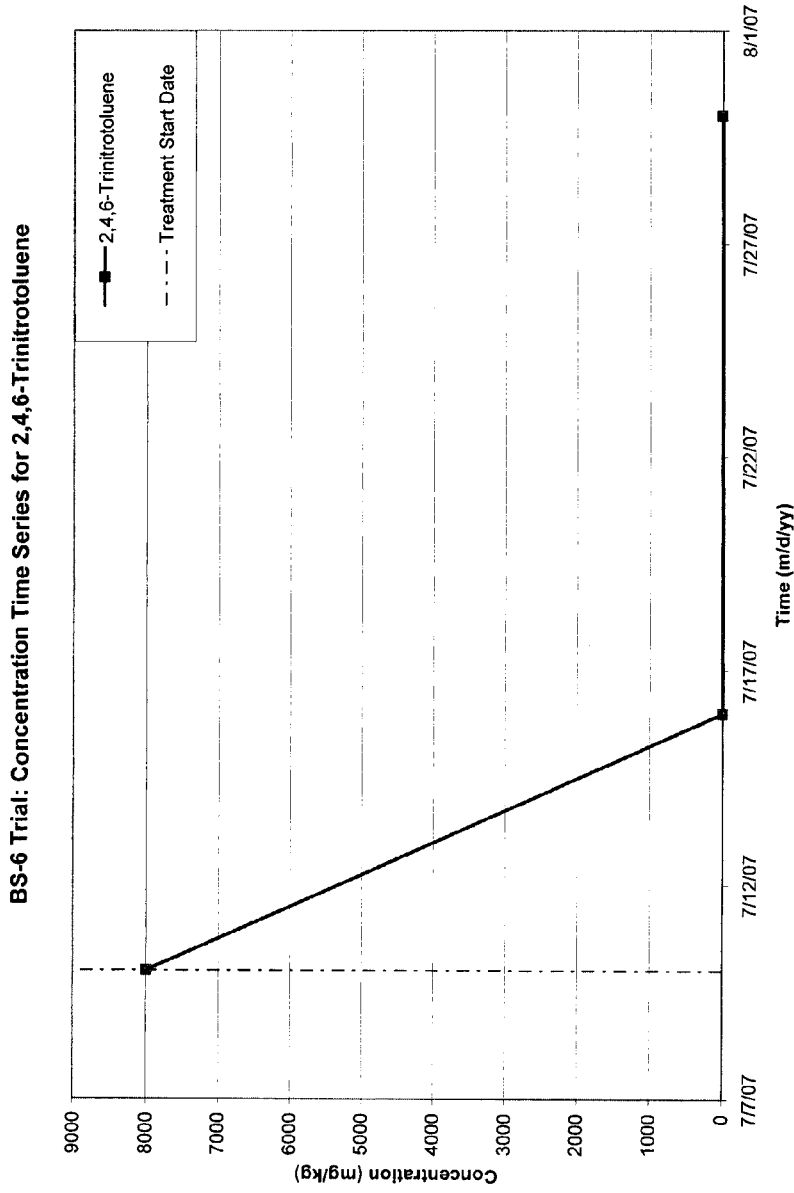
FIG. 3 shows a graph depicting concentration versus time for TNT.

This disclosure relates to surprising findings regarding a project ("the Project") using alkaline hydrolysis to remediate nitroaromatic soil contamination at the former Volunteer Army Ammunition Plant in Chattanooga, Tenn. VAAP was a Government-owned, contractor-operated facility for the production and storage of trinitrotoluene (TNT). VAAP was built between 1941 to 1943 in support of the U.S. World War II effort, and was then used to further support the Korean War and the Vietnam conflict. Production of TNT ceased in 1977. Past operations impacted both soil and groundwater including TNT and dinitrotoluene ("DNT") contamination in soils at concentrations as high as 10 percent in some locations.

An initial measure study for the Project recommended excavation, on-site stabilization, and off-site disposal of contaminated soil. The site specific clean up goals for the Project are reducing 2,4,6-TNT concentrations to 57 mg/kg; reducing total DNT concentrations to 25.4 mg/kg; and examining alternative chemical treatment options. The Project includes a number of phases including a bench-scale study for the treatment of DNT and TNT contaminated soil; a field pilot test based on the bench-scale results; a bench-scale study for the denitrification of the treated soil; and full scale soil treatment.

Bench Scale Study

The bench scale study was formulated with a number of objectives in mind including the following: evaluating chemical amendments with potential to treat contaminated soils; estimating the time required for treatment and kinetics of chemical degradation; determination of the approximate chemical quantities required for field scale evaluation (s); examining the by-products and the end-products from chemical degradation of TNT and DNT and reviewing the destruction of these products; evaluating the moisture and mixing requirements for full-scale remediation; and examining the procedures for full-scale treatment, including chemical handling, storage, mixing, equipment and analytical criteria.

During the bench scale, a number of chemical treatments were evaluated as remedial alternatives including chemical oxidation using calcium peroxide and/or hydrogen peroxide; and/or alkaline hydrolysis using lime and/or sodium hydroxide.

With regard to chemical oxidation, persons skilled in the art appreciate that strong oxidants react rapidly with aliphatic and aromatic compounds to destroy such compounds. The chemical mechanisms for such chemical oxidation destruction include, for example, hydroxyl addition, proton abstraction, electron transfer, and chemical substitution. The destruction occurs directly when adding strong chemical agents such as, for example, calcium peroxide. The destruction process occurs indirectly via the production of hydroxyl or peroxyl radicals which possess strong oxidative powers. It has been found that chemical oxidants destroy the bonds holding TNT and DNT together, converting the TNT and DNT molecules to simpler organic compounds (formate and acetate) and to inorganic constituents (nitrite or nitrate, carbon dioxide, and water). In order for chemical oxidation to occur, a minimum amount of moisture must be added. Drier conditions cause slower reaction kinetics, so saturated conditions are preferable. Additionally, mixing is an essential component to achieve contact of chemicals with contaminants for reactions to occur at optimal rates. Daily or alternate day mixing over the expected seven day treatment at the bench scale was an essential part of the treatment process.

Alkaline hydrolysis on the other hand is thought to be accomplished via the second order process of E2-elimination. Alkaline hydrolysis involves addition of lime (CaO or Ca(OH)$_2$) or other pH enhancers (e.g., NaOH, KOH) and proceeds much faster at higher pH levels. The process is exothermic and the first step in alkaline hydrolysis is often nucleophillic substitution. The exothermic nature of alkaline hydrolysis produces heat for a short period of time (measured in minutes), thereby transiently enhancing the reaction rate and reducing any applicable activation energy barrier, making the destructive reaction more kinetically favorable. Additionally, a catalyst such as metal salts (e.g., ferric chloride) may be used to further boost the alkaline hydrolysis process. Examples of alkaline hydrolysis chemical reactions are shown below.

Reaction with an Alkyl Halide:

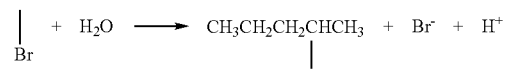

Reaction with a Carboxylic Ester:

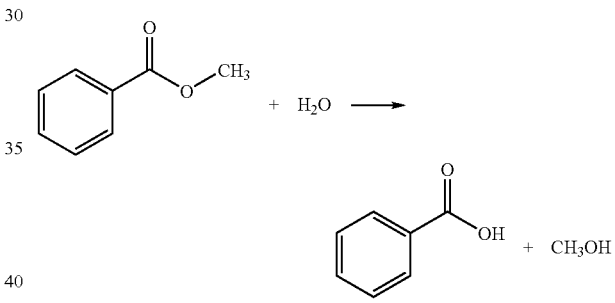

Reaction with Alkyl Chloride (Showing Stereochemistry):

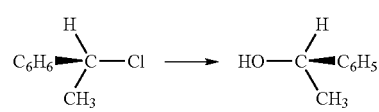

The bench scale set up included soil pans containing 10 pounds of soil from a contaminated area. The chemicals were added to each pan and combined thoroughly with the soil using mixing spoons. Following dry mixing, water was gradually added to each of the pans to produce saturated conditions. The pans were then covered and their contents mixed on a daily basis. Water was added on an "as-needed" basis to maintain soil saturation levels. A table summarizing the bench scale set up and various trials is shown in FIG. 1. Samples were collected from three locations within the parent container of Baseline Homogenized Soil ("BSH"), mixed thoroughly, and transferred to sample bottles. Baseline samples from each of the test trials were obtained in a similar manner. Following the addition and mixing of chemicals, soil was periodically evaluated from each of the test trials and analyzed for similar constituents. The sampling and analytical protocol is shown in FIG. 2.

During the bench scale testing, it was surprisingly found that alkaline hydrolysis using lime alone can destroy TNT and reduce the concentration of TNT below the goal of the Project. It was also discovered, however, that lime alone was unable to increase the pH of the soil above around 12.6. DNT is not readily destroyed unless a very high pH level is reached (typically pH≧13). Thus, lime alone was not able to reduce the concentration of DNT to desired levels. However, when sodium hydroxide was supplemented along with lime, DNT concentration was brought down significantly. The bench scale study showed that caustic soda (1% by weight of soil) can increase the pH to 13.0, a level essential for the destruction of DNT. The bench scale also showed that moisture addition follows similar guidelines as chemical oxidation and that moisture addition to saturation levels is key ingredient of the alkaline hydrolysis destructive reaction of nitroaromatic compounds.

The specific bench scale study results for Bench Scale number 1 ("BS-1") (using lime alone and then later supplementing with some NaOH) were a TNT reduction of about 70% in the first 48 hours of treatment. The clean up goal of 57 mg/kg was achieved in about two weeks. 2,4-DNT decreased by 50% over a ten day period and 2,6-DNT reduction was marginal. After BS-1 was augmented with NaOH (15 days after initial lime addition), DNT decreased rapidly by over 90%. Nonetheless, total DNT concentration remained above the cleanup goal of 25.4 mg/kg. It was surprisingly found that nitrite was by far the major inorganic end product increasing from about 16 mg/kg to about 2,550 mg/kg.

The results of bench scale numbers 2-4 ("BS-2," "BS-3," and "BS-4") (using lime and $CaO_2$) were favorable for TNT reduction in all trials, reducing TNT concentration from 9300 mg/kg to below the cleanup goal in about twenty days. However, neither of the DNT isomers responded well in these trials. Nitrite, the major inorganic end product in these trials, increased from 16 mg/kg to 5,160 mg/kg.

The results of bench scale number 5 ("BS-5") (using primarily $CaO_2$, then some NaOH, and $FeCl_3$) demonstrated a reduction of TNT by greater than 90% within 10 days of treatment, thereby attaining the TNT cleanup goals upon completion of trial. However, DNT reduction was poor during the first phase of treatment (using calcium peroxide only). However, upon augmentation with sodium hydroxide and ferric chloride, both isomers of DNT decreased by 90% but still remained above cleanup goals. Again, nitrite was the major inorganic end product, increasing to 2,420 mg/kg.

Figure 4:
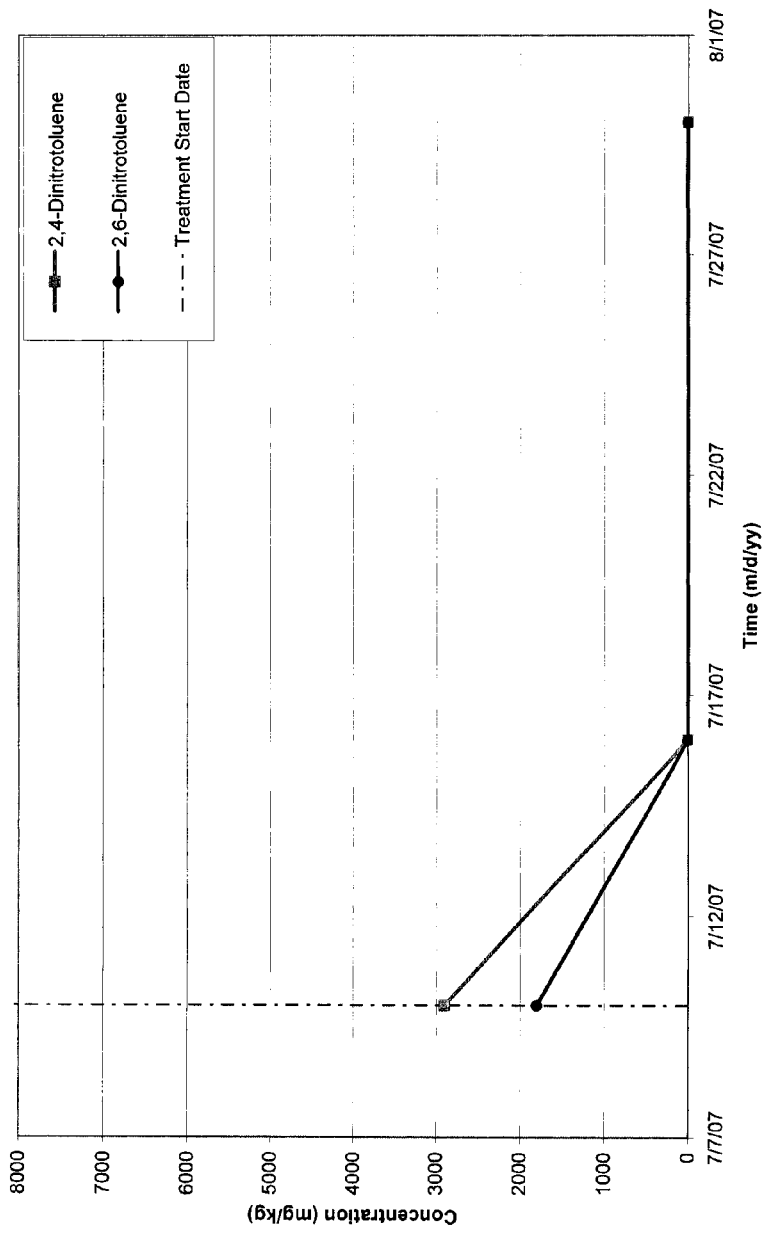
FIG. 4 shows a graph depicting concentration versus time for DNT.
Figure 5:
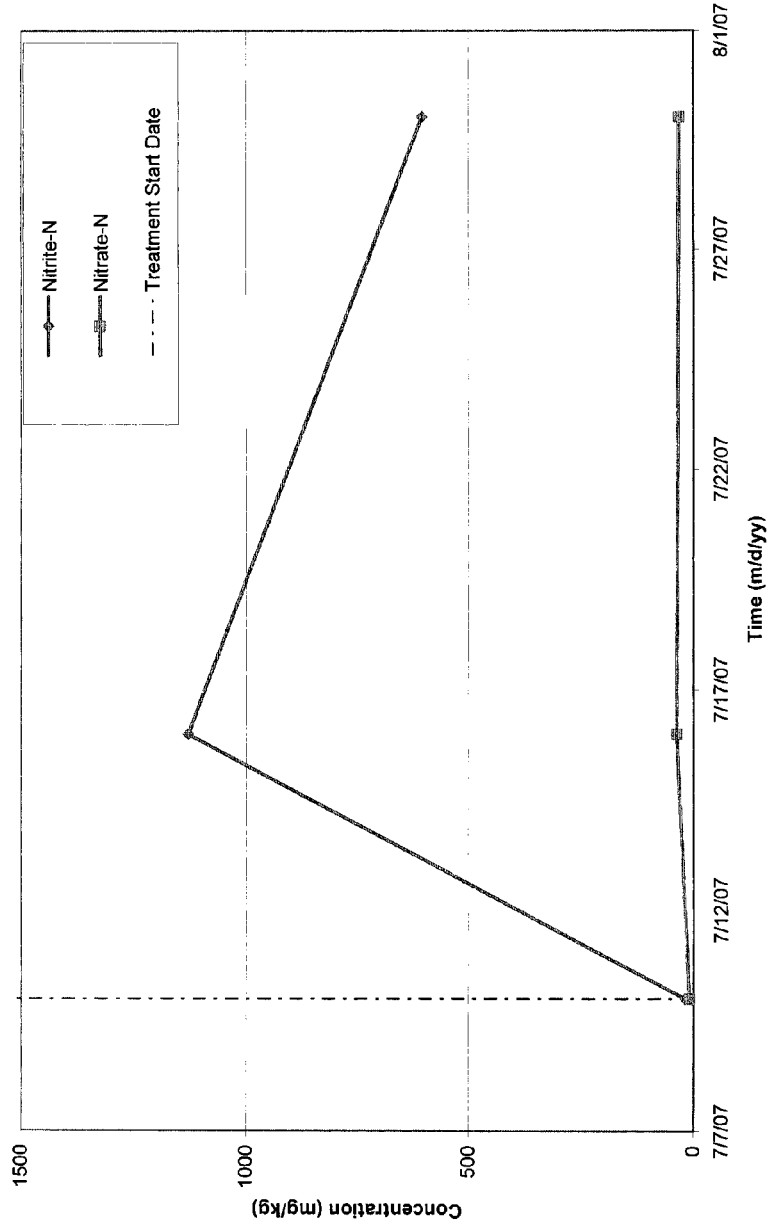
FIG. 5 shows a graph depicting concentration versus time graphs for nitrite.
Figure 6:
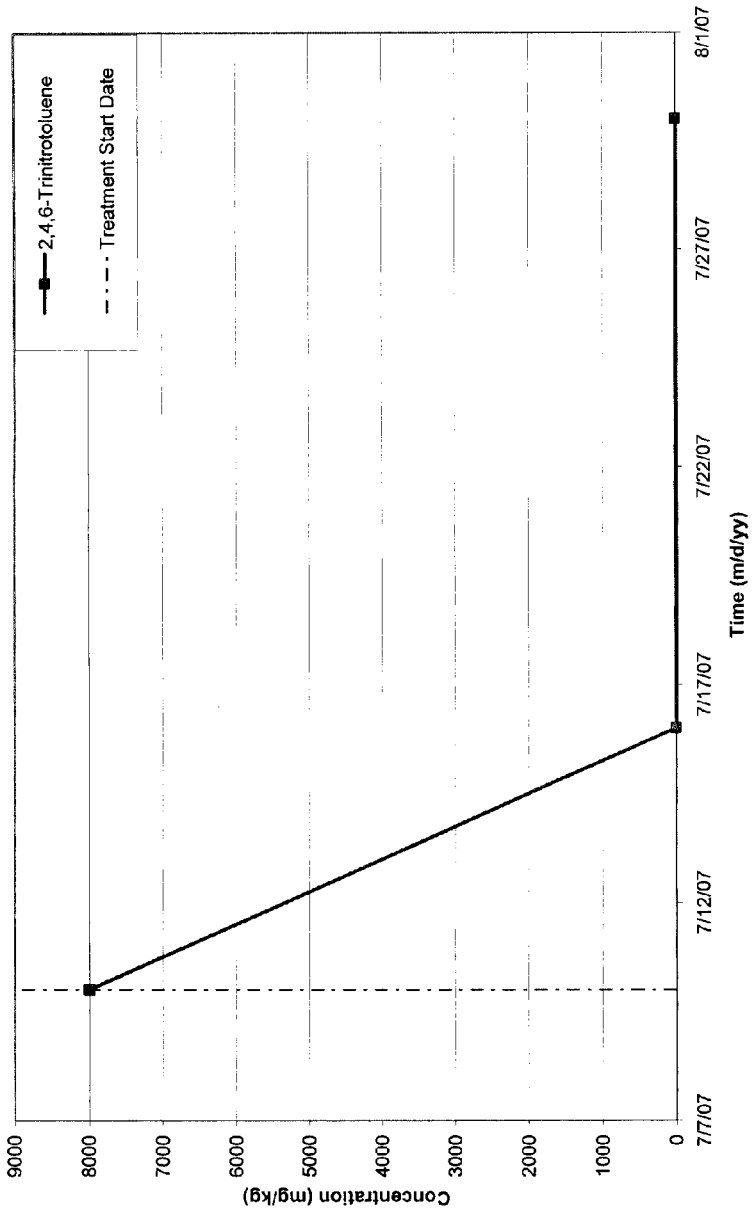
FIG. 6 shows a graph depicting concentration versus time graphs for TNT.
Figure 7:
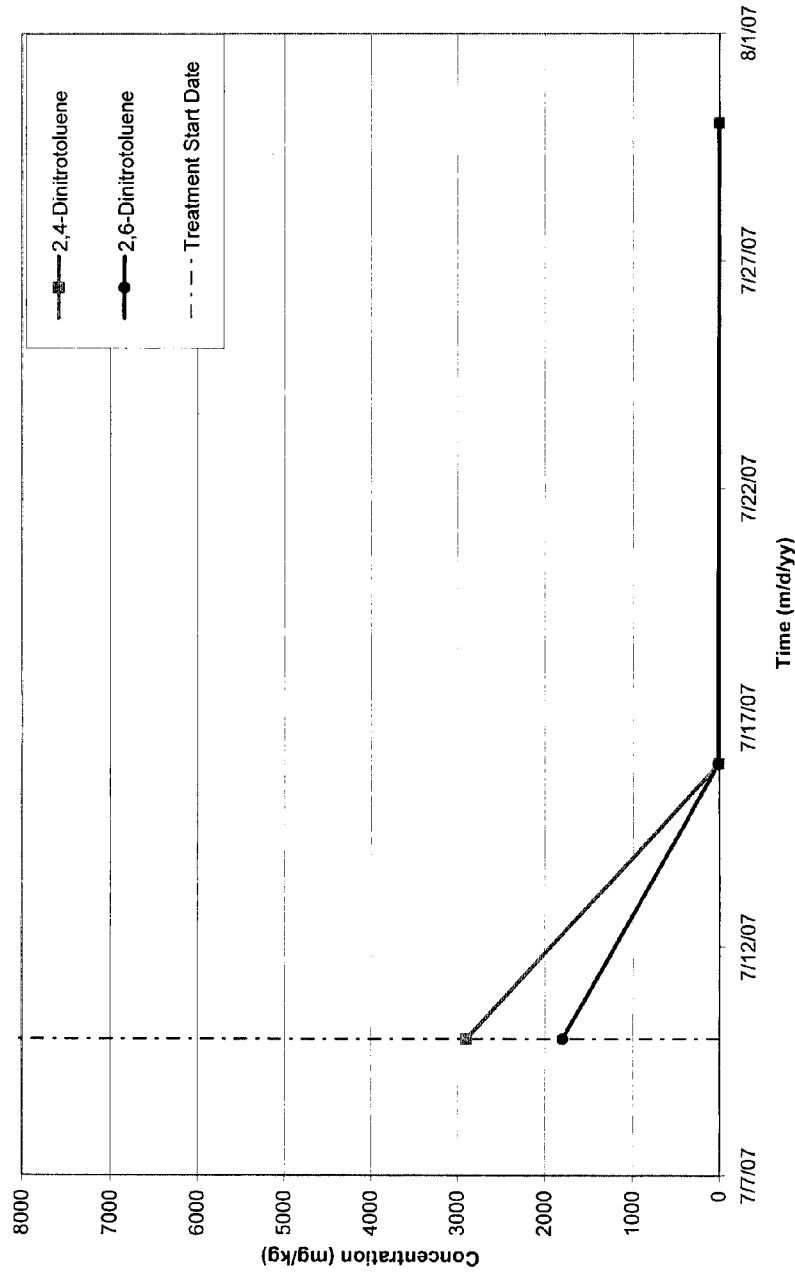
FIG. 7 shows a graph depicting concentration versus time graphs for DNT.
Figure 8:
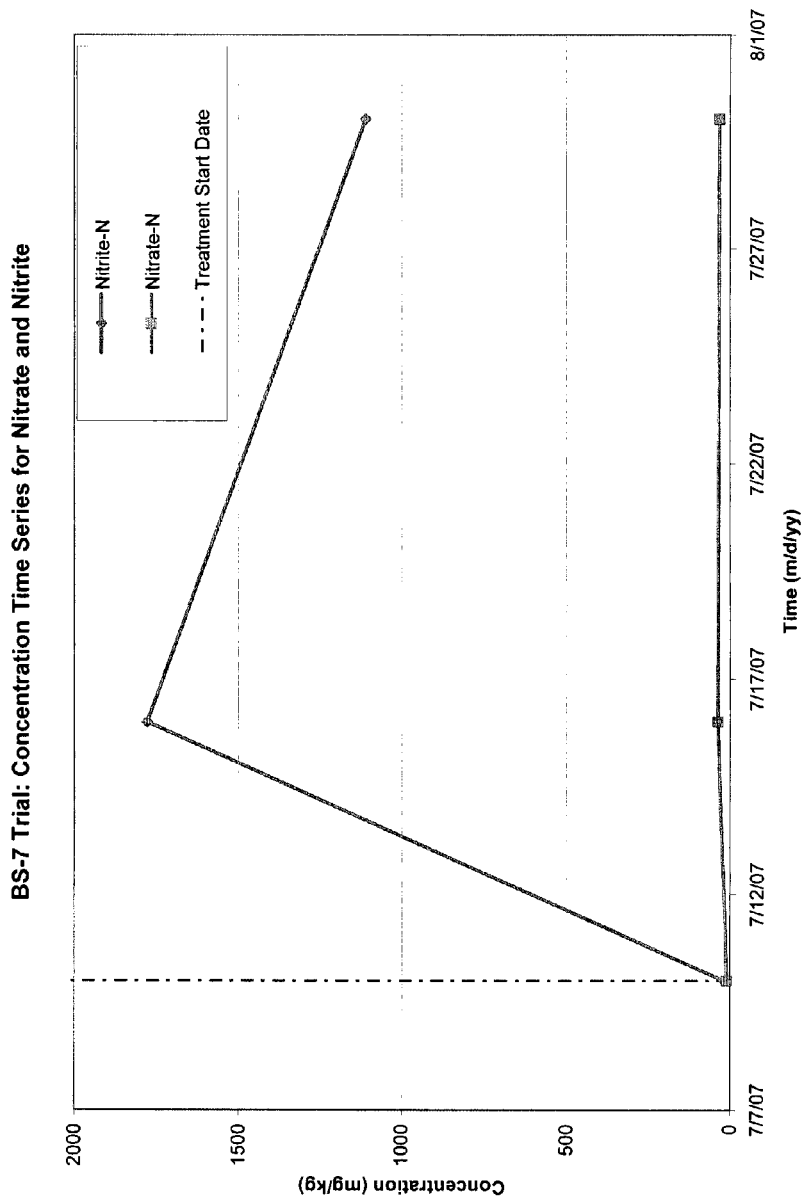
FIG. 8 shows a graph depicting concentration versus time graphs for nitrite.

The results of bench scale numbers 6-9 ("BS-6," "BS-7," and "BS-8") (using NaOH with only naturally occurring and/or trace amounts of lime, $CaO_2$, or $H_2O_2$) were all promising for both TNT and DNT, reducing all contaminants below the clean up goal within one week. Nitrite was the major inorganic end product, increasing in concentration by three magnitudes. BS-6 was a significant and surprising result because it was shown that alkaline hydrolysis using NaOH has the ability to degrade both TNT and DNT. Intermediate and daughter products did not appear to accumulate when using NaOH. Stoichiometric estimates showed that nitrite production in BS-6 accounted for about 90% of parent contaminants. FIGS. 3-5 show concentration versus time graphs for TNT, DNT and nitrite in BS-6. FIGS. 6-8 show concentration versus time graphs for TNT, DNT and nitrite in BS-7. After further analysis, the data suggested that use of a catalyst (e.g., ferric chloride) may not be necessary for these soils. More testing may need to be done to determine whether the addition of $FeCl_3$ or other similar catalyst actually enhances degradation rates and/or reduces activation energy barriers when NaOH is used.

Trial 9 (use of lime, $CaO_2$, NaOH, and $H_2O_2$) worked well for reducing TNT to below the clean up goal, but did not work as well for reducing DNT.

The bench scale study and the associated time series graphical plots indicated that degradation/destruction of TNT and DNT likely follow first-order kinetics expressed by Equation 1 as follows:

$$C = C_0 e^{-kt} \quad \text{(Equation 1)}$$

"C" represents the concentration of a first contaminant, "$C_0$" represents the initial concentration of the first contaminant, "k" represents the reaction constant given in units of $days^{-1}$, and "t" represents time. FIG. 9 shows a table representing a summary of degradation rate information for the various trials in the bench scale study.

Pilot Test

Figure 10A:
FIG. 10A shows a photo of an initial treatment pile of contaminated soil.
Figure 10B:
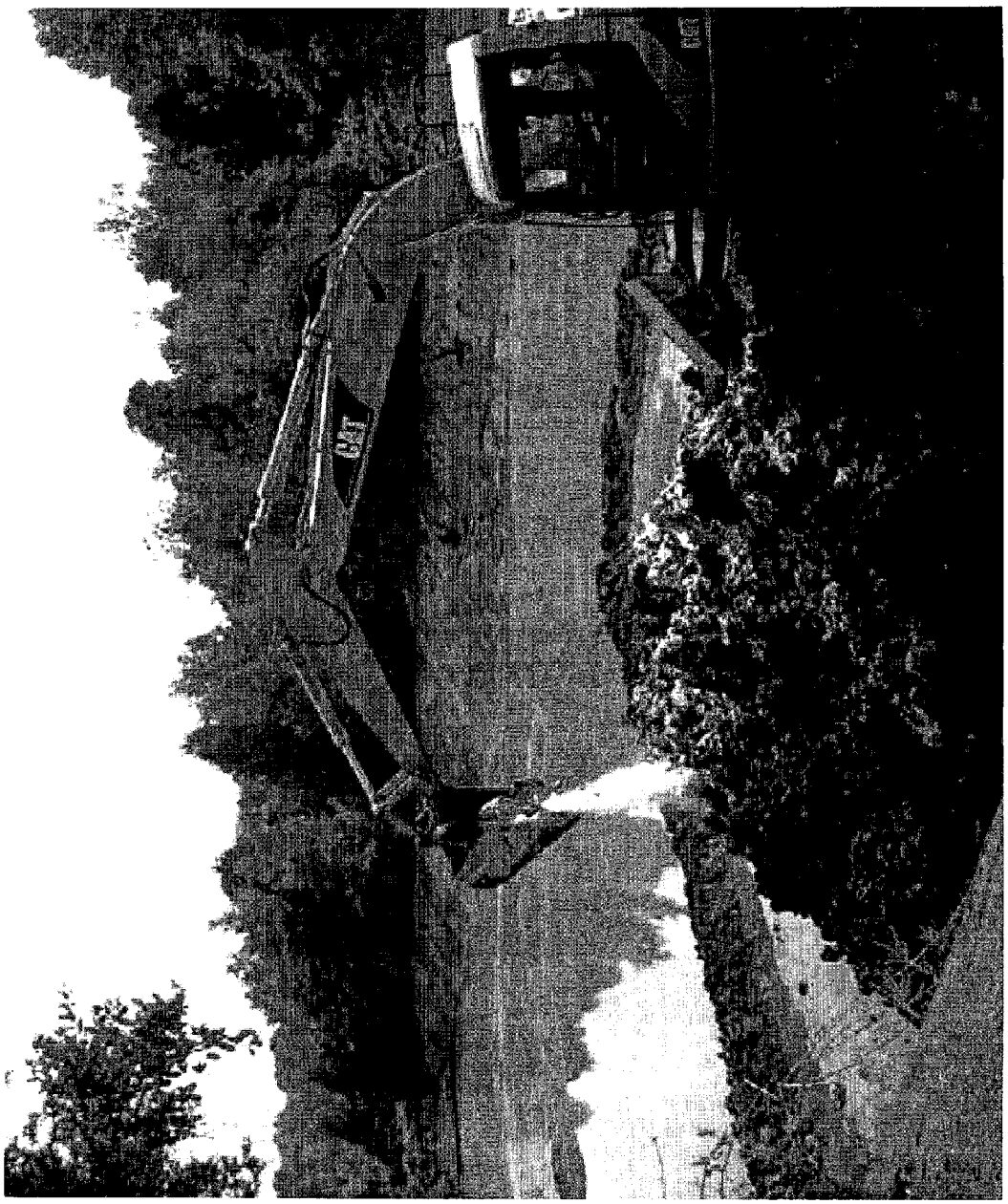
FIG. 10B shows a photo of the addition of NaOH to the treatment pile of FIG. 10A.
Figure 10C:
FIG. 10C shows a photo depicting the mixing of NaOH and a catalyst in the initial treatment pile of FIG. 10A.
Figure 10D:
FIG. 10D shows a photo depicting the watering of the treatment pile of FIG. 10A.

The Project further included a pilot test in which about 300 cubic yards of excavated soil were treated in a bermed area (about 100 ft by about 50 ft). Based on the bench scale study, 1.5% by weight of NaOH was added and mixed thoroughly with the contaminated soil, 300 gallons of $FeCl_3$ were then added and mixed, and water was added to the chemically-amended soil which was then mixed again. The soil was then mixed daily thereafter during the pilot test. Composite samples (30 point) were collected. Baseline samples were taken prior to the addition of chemicals. Final samples were taken seven days after the pilot test began. FIG. 10A shows the initial treatment pile; FIG. 10B shows the addition of NaOH to the treatment pile; FIG. 10C shows the mixing of NaOH and $FeCl_3$; and FIG. 10D shows the watering of the treatment pile. TNT and DNT concentrations were reduced to well below the Project cleanup goals. A soil pH of 13.0 was obtained, and reduced to about 12.2 after 1 week. The field degradation rates were as rapid as laboratory rates with no significant accumulation of intermediate or daughter products. It was noted that denitrification may be needed to combat the elevated nitrite levels, and a bench scale study for denitrification was recommended. Table 1 shows the baseline results dated Jul. 1, 2007, and Table 2 shows concentration levels as of Aug. 6, 2007.

TABLE 1

| Contaminant | Conc. (mg/Kg) |
|---|---|
| 1,3,5-TNB | 5 |
| 2,4-DNT | 800 |
| 2,6-DNT | 12 |
| 2,4,6-TNT | 230 |

TABLE 2

| Contaminant | Conc. (mg/Kg) |
|---|---|
| 1,3,5-TNB | 0.066 |
| 2,4-DNT | 1.6 |
| 2,6-DNT | 1.5 |
| 2,4,6-TNT | 0.64 |
| Amino-DNTs | 0.82 |
| Nitrotoluenes | 0.48 |

Denitrification Bench Scale

As a result of soils containing little oxygen, denitrifying bacteria remove oxygen from nitrate ($NO^{3-}$) and nitrite ($NO^{2-}$) ions, which in turn releases the degradation byproducts of dinitrogen gas, nitrous oxide, and nitrogen to the atmosphere. Along with saturation, soil containing high organic matter is important for denitrification to proceed. In practice, an organic acid is necessary (1) to provide the organic content needed by the bacteria and (2) to lower the pH to normal conditions because the soil pH following the alkaline hydrolysis process (for treating soil containing nitroaromatic compounds) is extremely alkaline. Before treated soils can be backfilled into the excavation, nitrite concentrations may need to be reduced.

A first objective of the denitrification bench scale aspect of the Project was to evaluate citric acid as an organic substrate to determine its potential to treat elevated nitrite concentrations in soil resulting from chemical destruction of TNT and DNT. Citric acid was chosen as the additive because it serves as a carbon source for denitrification bacteria, is capable of lowering the pH to neutral conditions. A second objective of the denitrification aspect of the Project was to estimate the time required for treatment and the kinetics of chemical degradation of the nitroaromatic contaminants in the soil.

The set up of the denitrification bench scale study included two soil pan tests—each containing 10 lbs of soil from a contaminated area. During a first phase, soil pan tests underwent alkaline hydrolysis to remediate the nitroaromatic compounds in the soil. Once alkaline hydrolysis treatment was complete (approximately 2 weeks), the denitrification bench-scale began. Approximately 6 oz. of citric acid waste were added to one of the soil pan tests, denoted as BS-A. No citric acid was added to BS-B as the control.

Figure 12:
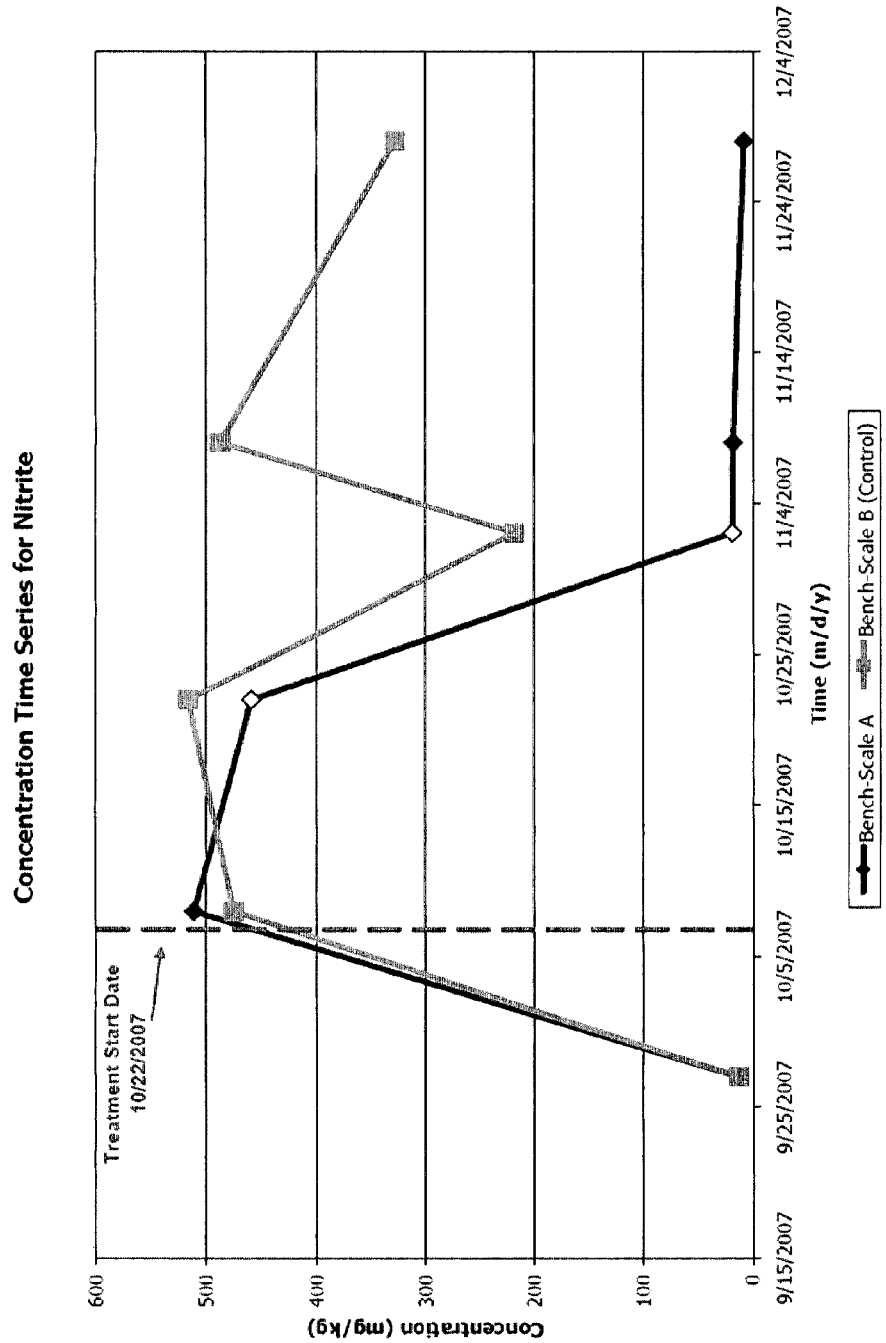
FIG. 12 shows a graph depicting the concentration for nitrite during a denitrification bench scale study.
Figure 13:
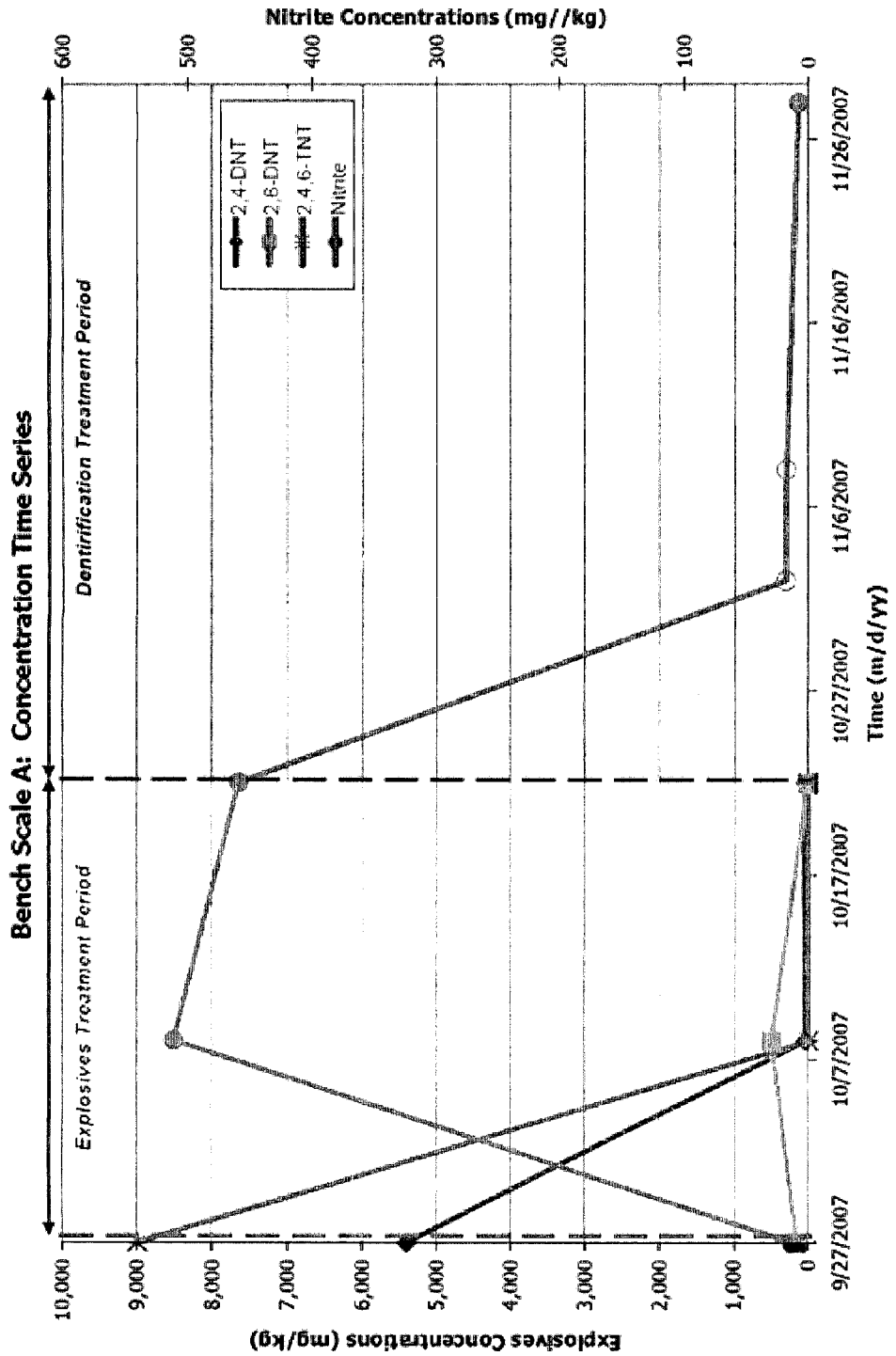
FIG. 13 shows a graph depicting the respective concentrations of TNT, 2,4-DNT, 2,6-DNT, and nitrite (experimental) over time during a denitrification bench scale study, the graph depicting both a first phase (a nitroaromatic treatment period) and a second phase (a denitrification treatment period)

Samples were collected from three locations within the parent container (BSH), mixed thoroughly, and transferred to sample bottles. Baseline samples from each of the test trials were obtained in a similar manner. Following the addition and mixing of chemicals, soil was periodically evaluated from each of the test trials and analyzed for similar constituents. Both test trials showed a substantial decrease in nitroaromatic compounds. FIG. 11 shows the sampling and analytical protocol of this part of the Project. Total DNT and 2,4,6-TNT exhibited greater than a 99% percent decrease in concentrations over the course of the two-week treatment. Nitrate was not formed in significant concentration compared to baseline results indicating very little oxidation from nitrite to nitrate. Nitrite concentrations surprisingly decreased from a relatively high concentration of 511 mg/kg to a nondetectable level during the first twelve days, indicating no toxicity to microorganisms at these levels. The degradation rate for nitrite was calculated to be 0.292 day$^{-1}$. FIG. 12 shows the concentration for nitrite during the denitrification bench scale study for both the experimental and the control samples. FIG. 13 shows the respective concentrations of TNT, 2,4-DNT, 2,6-DNT, and nitrite (experimental) over time during the denitrification bench scale study (both Phase I [nitroaromatic treatment period] and Phase II [denitrification treatment period]). It was concluded that citric acid is an effective denitrification additive. As of to-date, approximately 20 percent of site soils have required denitrification because of nitrate/nitrite concentrations exceeding site-specific target concentrations. These soils have been successfully treated using citric acid in the field.

Updated Bench Scale Results

The months of July through October of 2008, additional bench tests were performed including both batch tests and column tests on saturated soils from the Project. The batch tests were used to test whether certain treatment agents in an ideal reaction environment would be effective in treating certain hazardous materials in the saturated phase. The column tests went a step further and tested undisturbed soil cores from the field to simulate field treatment. The results of these tests are described below and shown in FIGS. 14-20.

Figure 14:
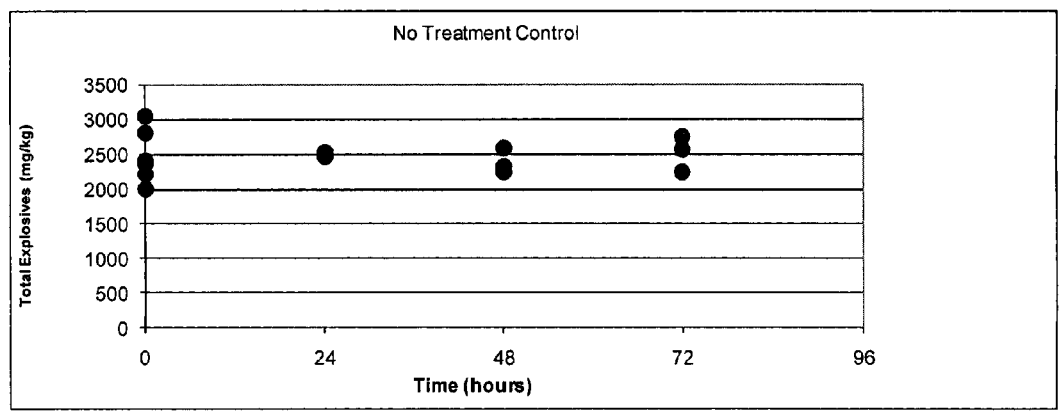
FIG. 14 shows the result of a control batch test run in which no remediation treatment was added.
Figure 15:
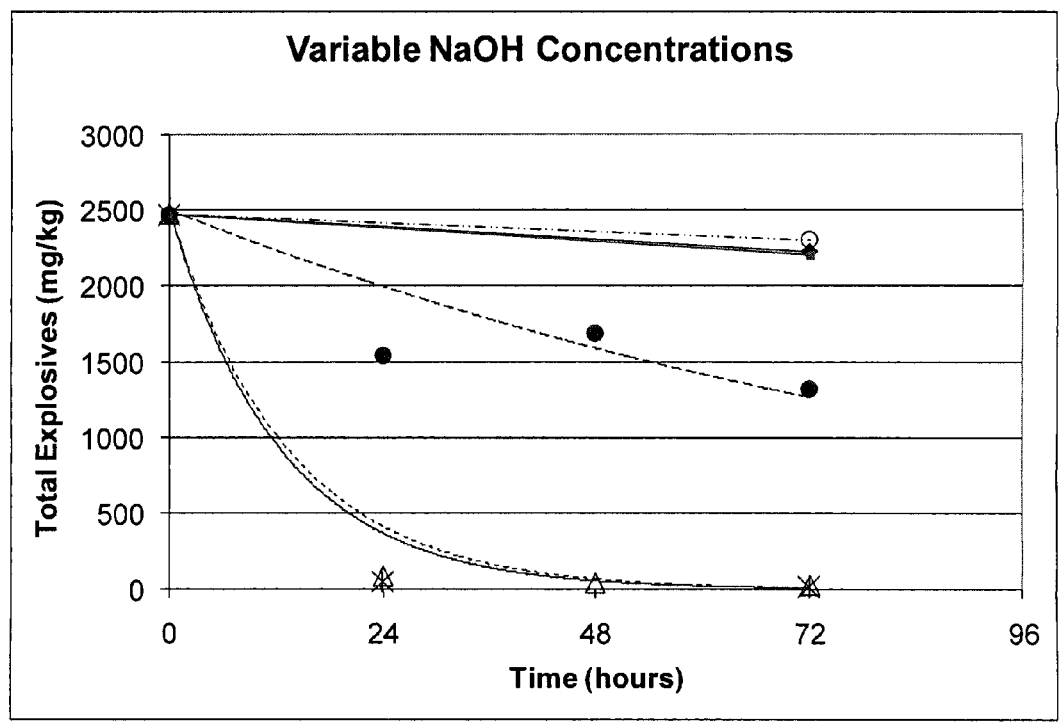
FIG. 15 shows the change in concentration of total nitroaromatics with respect to the addition of different dose concentrations of sodium hydroxide in various batch test runs.
Figure 16:
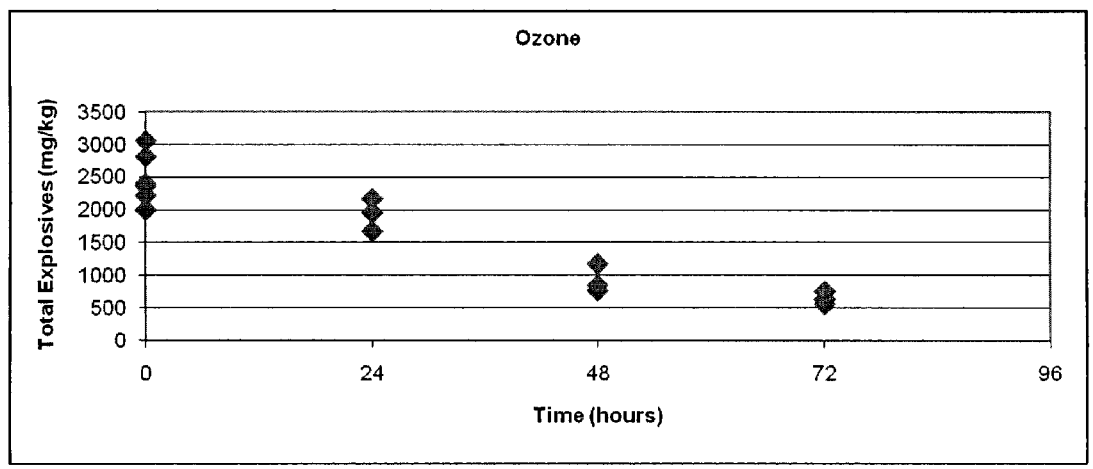
FIG. 16 shows the change in concentration of total nitroaromatics with respect to the addition of ozone in a batch test run.
Figure 17:
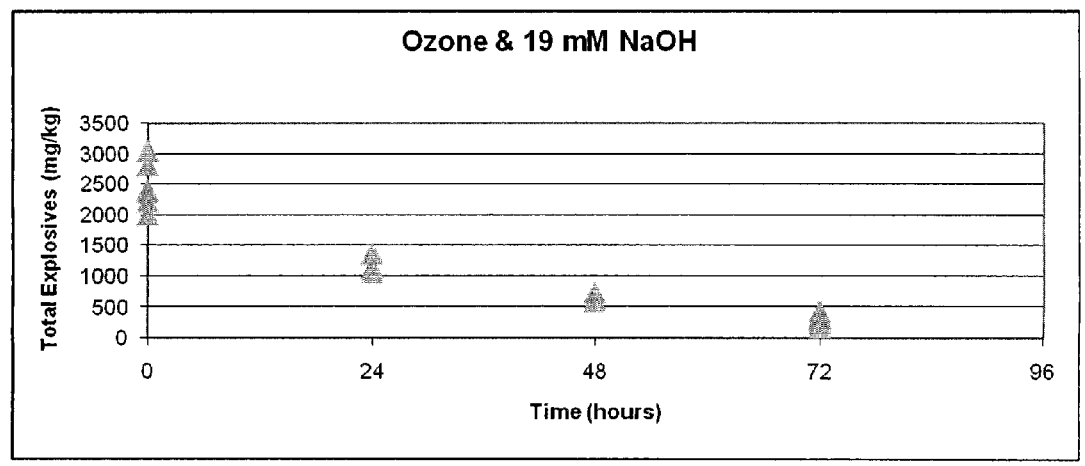
FIG. 17 shows the change in concentration of total nitroaromatics with respect to the addition of ozone and a 19 milliMolar (mM) sodium hydroxide mixture in a batch test run.
Figure 18:
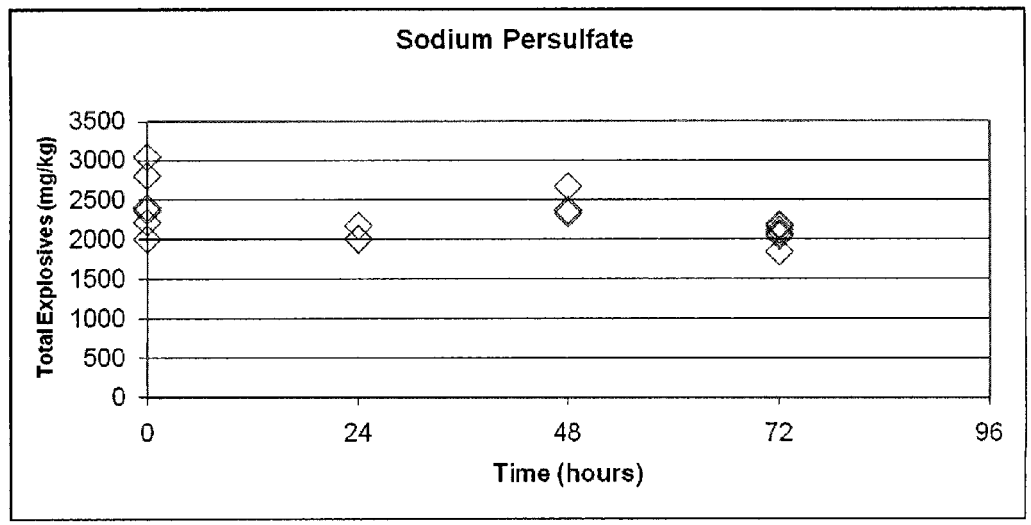
FIG. 18 shows the change in concentration of total nitroaromatics with respect to the addition of sodium persulfate in a batch test run.
Figure 19:
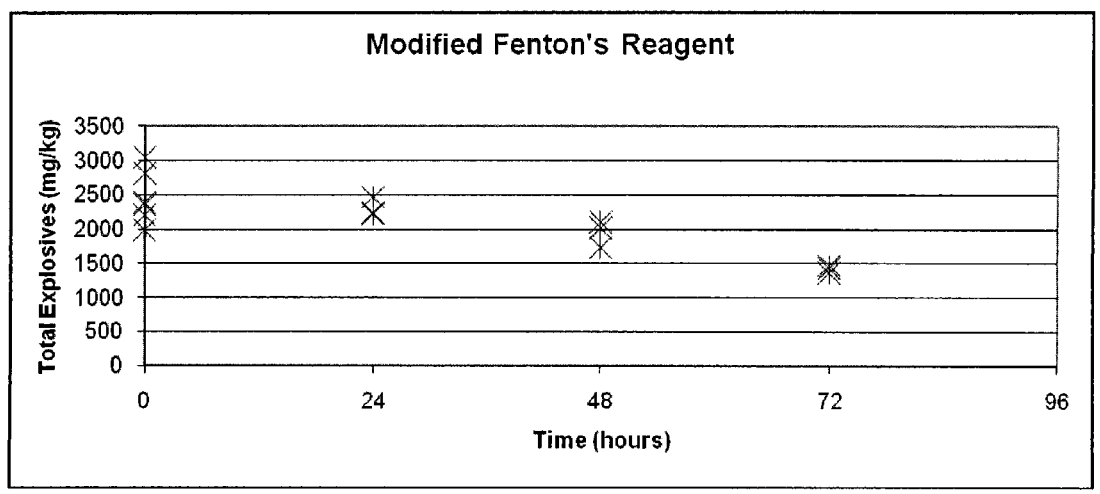
FIG. 19 shows the change in concentration of total nitroaromatics with respect to the addition of modified Fenton's Reagent in batch test run.

The batch tests were used to test NaOH, ozone, sodium persulfate, modified Fenton's reagent ("MFR"), and combinations of selected treatments. Table 3 shows the method in which the various treatments were added to their respective batch. FIG. 14 shows the result of the control batch in which no treatment was added. FIG. 15 shows the change in concentration of total explosives with respect to the addition of different dose concentrations of NaOH. FIG. 16 shows the change in concentration of total explosives with respect to the addition of ozone. FIG. 17 shows the change in concentration of total explosives with respect to the addition of ozone and a 19 milliMolar (mM) NaOH mixture. FIG. 18 shows the change in concentration of total explosives with respect to the addition of sodium persulfate. Finally, FIG. 19 shows the change in concentration of total explosives with respect to the addition of modified Fenton's Reagent.

TABLE 3

| Reagent | Time (t) [in hours] |
| --- | --- |
| NaOH | t = 0 |
| Sodium Persulfate | t = 0 |
| Mod. Fenton's Reag. | t = 0, 24, 48 |
| Ozone | continuously |

FIG. 20 shows a summary table indicating the overall comparative results of the batch tests, and the use of 50 or 100 mM dose concentrations of NaOH were surprisingly by far the best performing of the various treatment agents tested generating at least about 99% change in concentration of total explosives in a 72 hour period. The influence of NaOH on sample pH is shown in FIG. 21. The use of ozone in combination with a 19 mM dose concentration of NaOH was effective at achieving an admirable 88% change in concentration of total explosives. Ozone used alone came in fourth with only about a 70% change in concentration of total explosives. Surprisingly, sodium persulfate performed particularly badly in the batch (ideal conditions) tests, indicating that it would theoretically perform even worse under actual in situ conditions. MFR also did not perform particularly well during the generous 72 hour period of time in ideal conditions, achieving less than a 50% concentration drop.

Based on the batch rests, similar chemical tests were performed in columns of actual soil samples. The treatment agents selected for the column tests were those that showed the most promise in the batch tests (i.e., NaOH, ozone, and a combination of NaOH and ozone). Each of the columns was first flushed with artificial groundwater ("AGW") at a rate of about 1 milliliter per minute (ml/min). The artificial groundwater included sterile water with 5 mM $CaCl_2$. The initial flushing of each column allowed for the calculation of initial saturated hydraulic conductivity (Ksat) as well as provision of effluent samples for initial explosives concentration. In total, thirty pore volumes (PV) were applied to each test column resulting in a total of 16.5 L of fluid through each column. The concentrations in the respective effluents per PV are shown comparatively in FIG. 22, and the column test initial conditions are shown in Table 4 below.

TABLE 4

| Column | Treatment | Initial Total Explosives in soil (mg/kg) | Initial Total Explosives in effluent (µg/L) |
| --- | --- | --- | --- |
| HCOC-3 | Control (AGW only) | 10,528 | 278,708 |
| HCOC-2 | Ozone (AGW with ozonated oxygen) | 11,274 | 403,357 |
| HCOC-4 | Ozone + NaOH (200 mM) in AGW | 7,332 | 107,238 |
| HCOC-5 | NaOH (50 mM) in AGW | 3,084 | 264,603 |

Figure 22:
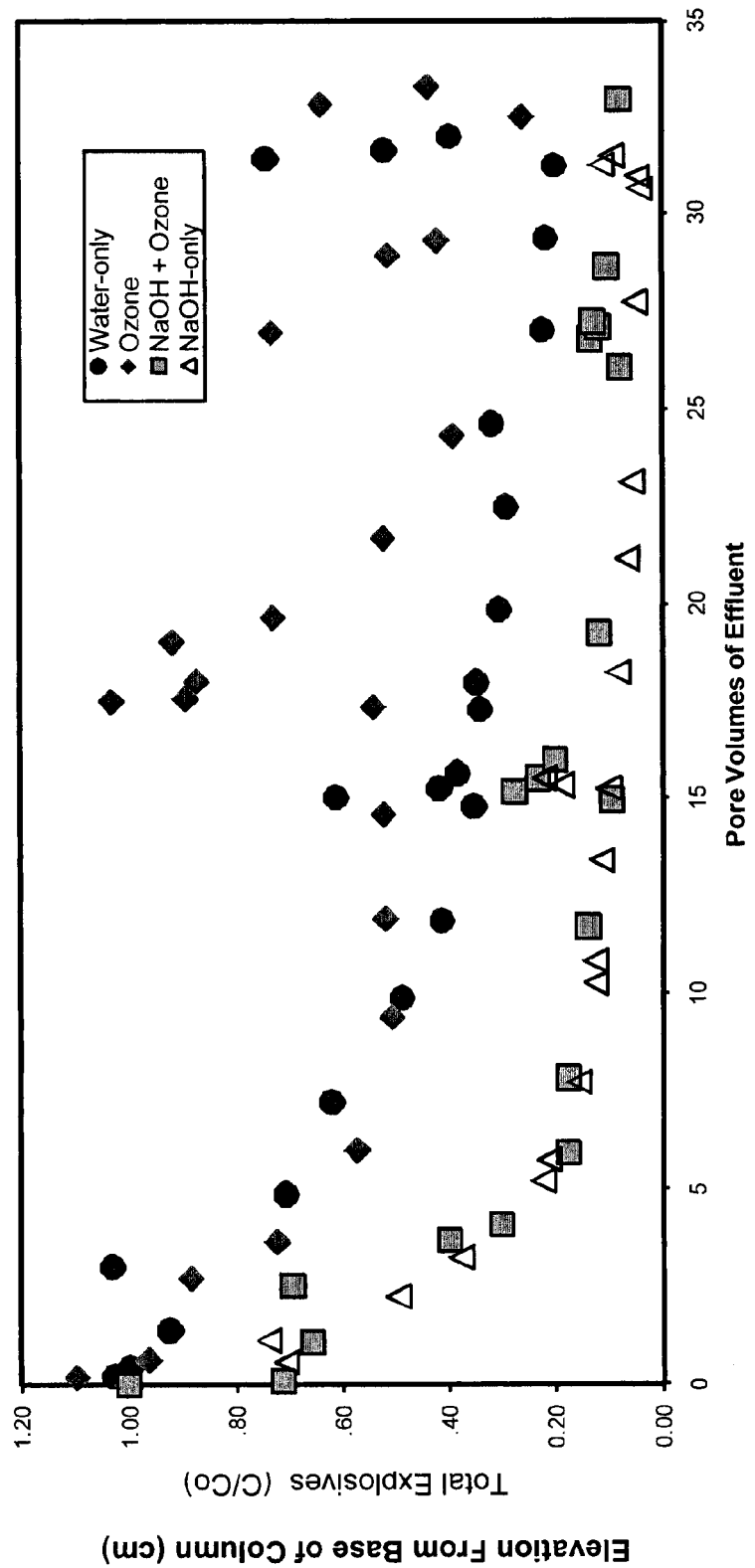
FIG. 22 shows the concentrations in the respective effluents from the test runs in FIGS. 14-19 per pour volume.

Interruptions were made at 15 PV and 30 PV to potentially detect any "rebound" in concentration of explosives in the fluid effluent. A "high rebound" indicates that contaminants are being removed from the liquid in the sample but the solid (e.g., soil) is retaining a high concentration of contaminants. When new fluid is added after an interruption, the low concentration of explosives in the fluid coming in contact with the high concentration of explosives creates a temporary disequilibrium, thereby causing the higher concentrated contaminants in the soil to transfer to the more dilute fluid. The more significant the disequilibrium, the higher the "rebound" shown on a concentration versus PV chart. Limited or no rebound is more desirable because a low rebound indicates that the concentration of contaminants (e.g., explosives) in both a dynamic testing medium (e.g., artificial groundwater) and a static medium (e.g., a soil sample) are being treated as opposed to just temporarily treating the dynamic medium alone while having little impact on the static medium. FIG. 22 clearly shows that NaOH alone had a small rebound compared to the other treatment agents tested.

Figure 23:
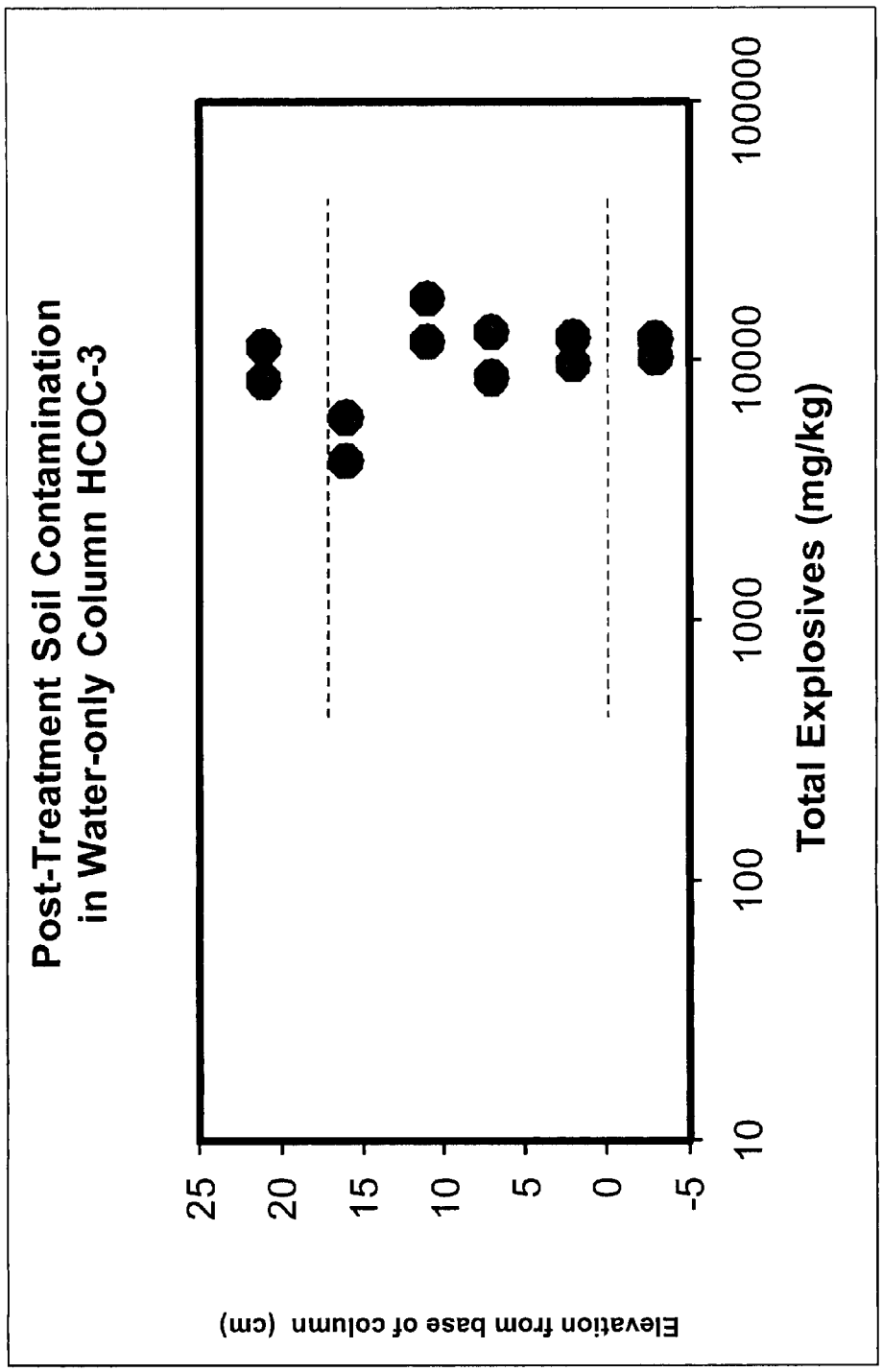
FIG. 23 shows the elevation of the control column versus the concentration of nitroaromatics taken directly sampled from the soil in the column after the test batch runs.
Figure 24:
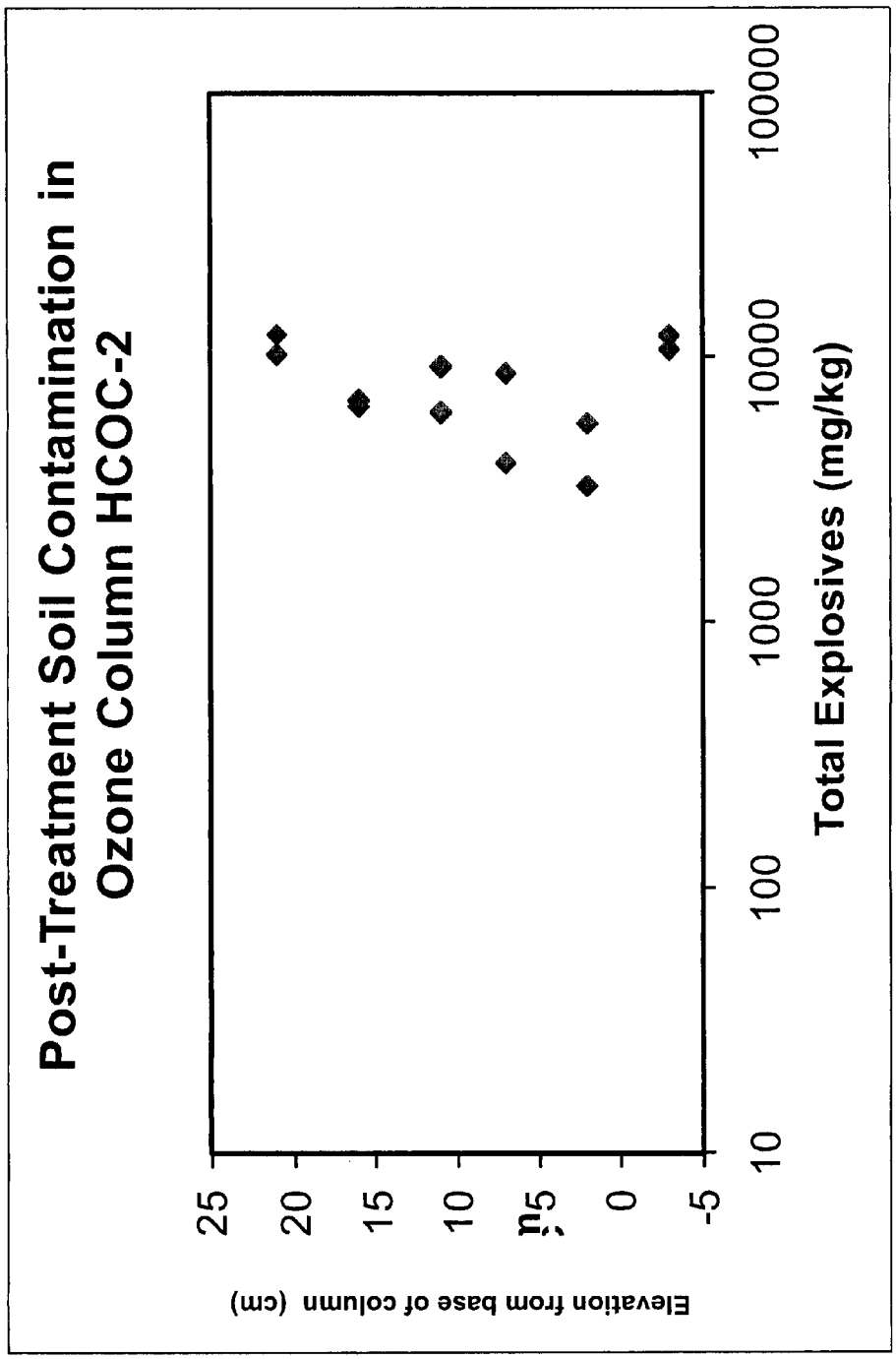
FIG. 24 shows post-treatment soil contamination in the ozone test column referred to in FIG. 16 by column elevation.
Figure 25:
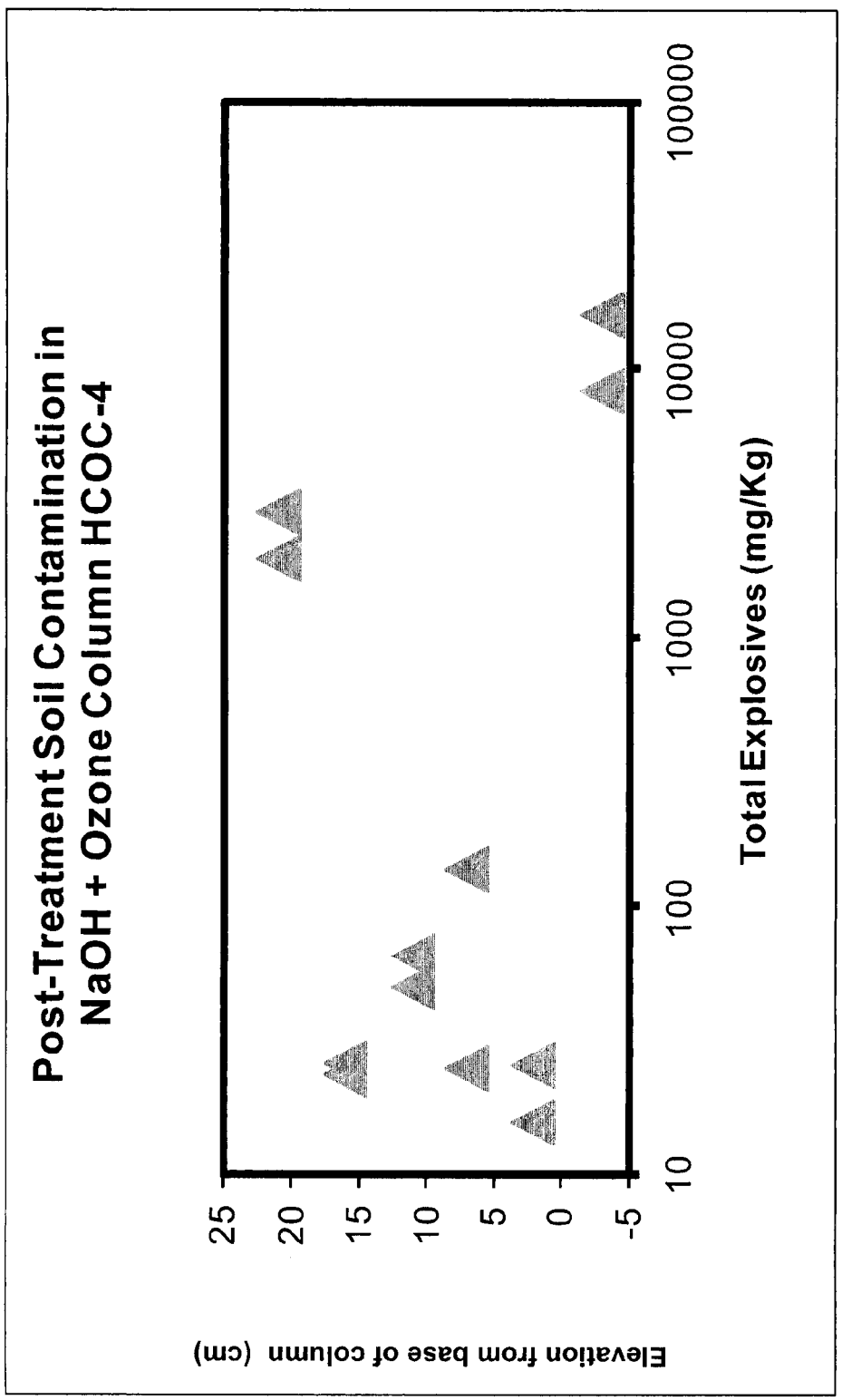
FIG. 25 shows post-treatment soil contamination in the ozone plus sodium hydroxide test column referred to in FIG. 17 by column elevation.
Figure 26:
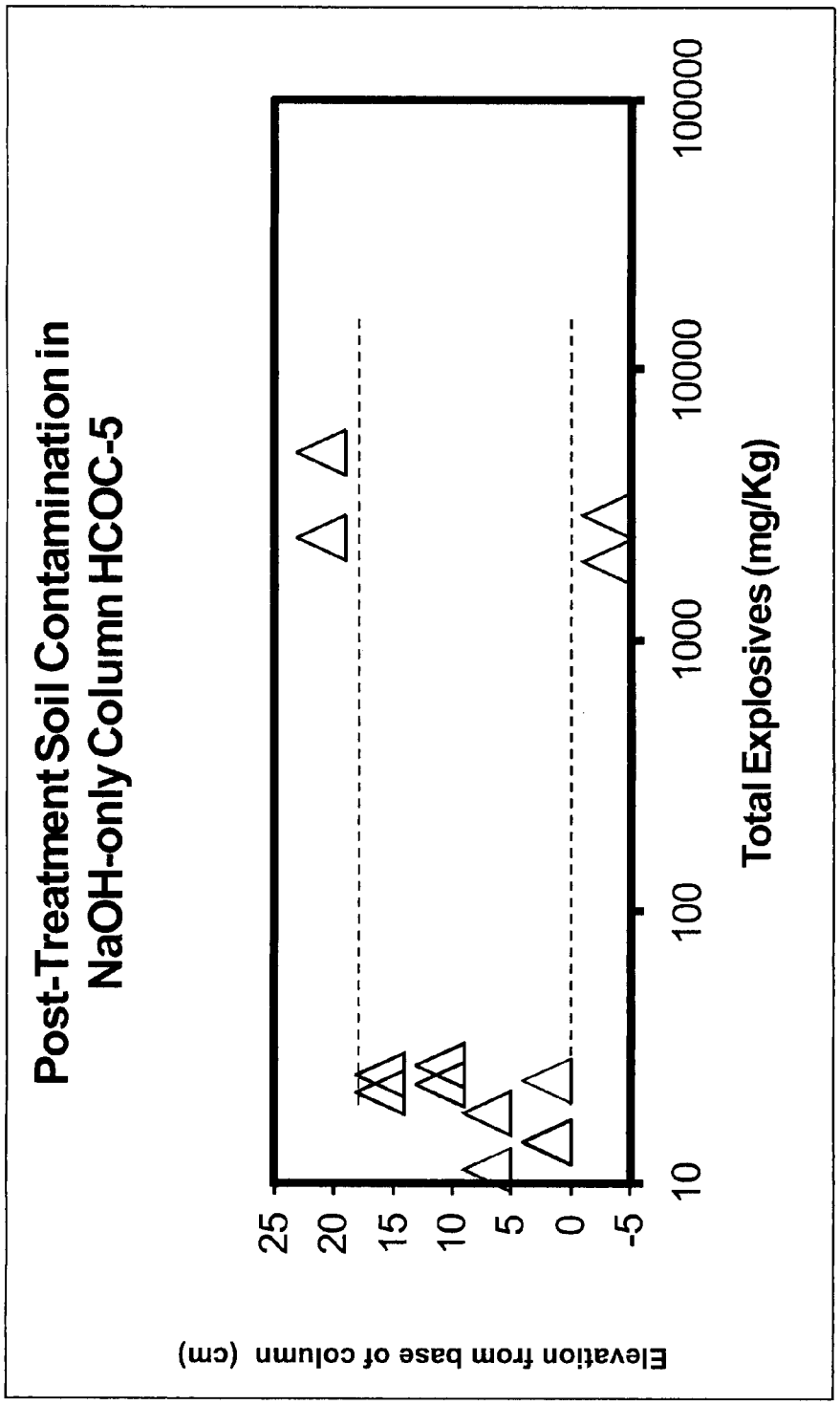
FIG. 26 shows post-treatment soil contamination in the sodium hydroxide test column referred to in FIG. 15 by column elevation.

FIGS. 23-26 further demonstrate and verify that NaOH at 50 mM concentration dose performed much better in not only treating the dynamic medium but also the static medium when compared to the other treatment agents. For example, FIG. 23 shows the elevation of the control column versus the concentration of explosives. Specific samples of the solid medium (soil) were taken at each data point at the various elevations along the column, and these data indicate the concentration of explosive remained unchanged during the treatment. FIG. 24, showing the static medium data for ozone, indicate that concentration of explosives never made it lower than about 5000 mg/Kg. FIG. 25 shows that most of the data points for the NaOH (200 mM) plus ozone combination reached below 100 mg/Kg. In the end, however, NaOH (50 mM) alone performed the best, reducing the concentration of explosives to levels no greater than 50 mg/Kg as shown in FIG. 26. Thus, NaOH at a dose concentration of 50 mM was effective at reducing high (saturated) levels of explosives contaminated soil by at least two levels of magnitude and within the target range for TNT (i.e., less than about 57 mg/Kg).

The goals of the chemical oxidation column study included determining which oxidant works better, which oxidant requires less pore volumes to achieve meaningful results, and which oxidant provides greater saturated soil cleanup. In order for a treatment agent to have become considered for a field scale treatability test, such treatment must have been capable of reducing total concentration of contaminants in soil by greater than 90% and have had a rebound of less than 20%. The control column and the ozone column failed to reach these goals. NaOH (50 mM) alone and NaOH (200 mM) plus ozone both met the above-mentioned goals with greater than 90% reduction of contaminant concentration as well as lower than 20% rebound in concentration of contaminant ion the effluent.

Low nitrate and nitrite concentrations in the effluent streams were detected throughout the column testing as well as low ferrous and low total iron concentrations as shown below in Table 5. These numbers are promising because they indicate the treatment process does not result in a sacrifice in groundwater quality by introducing unnecessary anions and/or cations into the groundwater.

TABLE 5

| Chemical Parameter | Concentration (mg/L) |
|---|---|
| Control (nitrate) | 2.4 to 1.5 |
| Ozone (nitrate) | 3.0 to 2.2 |
| NaOH + ozone (nitrate) | 1.9 to 2.2 |
| NaOH (nitrate) | 24.6 to 11.6 |
| Control (ferrous iron) | 0.05 to 0.03 |
| Ozone (ferrous iron) | 0.05 to 0 |
| NaOH + ozone (ferrous iron) | 0.02 to 0.03 |
| NaOH (ferrous iron) | 0.05 to 0.17 |

Full Scale Process

During full scale testing, soils were excavated and treated on-site within an asphalt-lined former pH control pond. Soils were treated in 300 cubic yards increments, and enough NaOH was evenly spread on the soil awaiting treatment such that the pH would become greater than 12.6. This equaled roughly 12,000 pounds of caustic soda per 300 cubic yards of soil. Excavators were used to work the chemical into the soil to obtain a somewhat homogenized dry mix. A minimum of three equipment passes were made to ensure homogenized blending and mixing. Water was then added to saturate the treatment piles. Substantial saturation was confirmed by visual confirmation. Approximately 1,500 gallons of water was used per 300 cubic yards of soil. The mixture was mixed daily and water was added daily to maintain moisture as needed based on mixing and visual observations. Over the course of the five to ten day treatment, the mixture was further mixed as needed to ensure uniform destruction of the nitroaromatic compounds.

The primary indicator of substantially uniform physical and chemical mixing of the soil chemicals was pH. The initial pH after adding NaOH and initial mixing was greater than 12.6. Using standard SW-846 procedures, fifteen independent samples were collected from each 300 cubic yard pile for pH tests.

For operational sampling, an on-site laboratory provided rapid turn around time for sampling results. One 30-point composite sample was taken per 300 cubic yard "baseline." Samples were collected at Day 5 and analyzed for nitroaromatic compounds. If cleanup goals met, a treatment pile is moved and stockpiled for pH reduction. If cleanup goals are not met, a treatment pile is sampled again on five-day intervals until such goals are met. NaOH and water may be added as needed.

For confirmation sampling, an on-site laboratory provided rapid turn around time for sampling results. pH reduction and denitrification may be conducted if needed using citric acid or other similar organic acid after alkaline hydrolysis steps meet operational goals. Ten 20-point composite samples were taken per 300 cubic yards. The samples are analyzed for nitroaromatic compounds, nitrate, nitrite, metals, and pH. Once a treatment pile has been determined to meet the target concentrations, soils are moved from the treatment area for use as backfill in the excavations.

As of the filing of the provisional application this disclosure claims priority to, treatment of 28,500 cubic yards had been completed with an average percent mass reduction of 92% of nitroaromatic compounds. The total mass of nitroaromatics that had been reduced at that time was approximately 42,000 lbs. These figures are represented further in Table 6.

TABLE 6

| Avg. Initial Conc. (mg/Kg) | | Ave. Final Conc. (mg/Kg) | | Change (%) |
| --- | --- | --- | --- | --- |
| 2,4,6-TNT | 205 | 2,4,6-TNT | 3 | 98.5 |
| 2,4-DNT | 96 | 2,4-DNT | 6 | 93.8 |
| 2,6-DNT | 24 | 2,6-DNT | 2 | 91.7 |
| Total DNT | 116 | Total DNT | 8 | 93.1 |

Now that almost a year has passed, about 100,000 cubic yards have been treated and the average percent reduction of nitroaromatic compounds is up to over 95%.

The updated data for full in situ treatment in the vadose zone is shown in Tables 7-17 below. In this full scale in situ situation, a total of 25,415 cubic yards of TNT and DNT contaminated soil required in situ soil treatment using alkaline hydrolysis as described herein. The in situ testing treatment began in April of 2009 and continues as of the filing date of this application. The depths of treatment range from 1 to 20 feet below ground surface (bgs). The starting concentrations for total explosives (sum of 2,4-DNT, 2,6-DNT, and TNT) within the treatment sites range from non-detectable amounts to about 9,800 milligrams per kilogram (mg/kg), with an overall average concentration of about 433 mg/kg. The initial total explosive contaminant mass requiring treatment was originally approximately 43,253 pounds (lbs).

Although much soil remains to be treated in situ, several treatment areas have successfully completed the alkaline hydrolysis process and explosive concentrations are now below the required cleanup goals. A summary table (Table 7) is provided below to show total soil quantities for each treatment status. The units are in cubic feet ($ft^3$).

TABLE 7

| Treatment Completed | 975 |
| --- | --- |
| Treatment Completed; Requires pH adjustment | 1,939 |
| Consumed | 71 |
| Inaccessible | 9,515 |
| In Progress | 3,897 |
| Treatment Pending | 9,018 |

The total mass reduction at the end of June 2009 was about 4300 lbs (approximately 10% of the initial mass to be treated). The average treatment duration for this combination of explosives has been about 21 days. After the NaOH was first applied, pH values of about 12.3 to about 13.0 were obtained, wherein the average was a pH of about 12.5.

Figure 27:
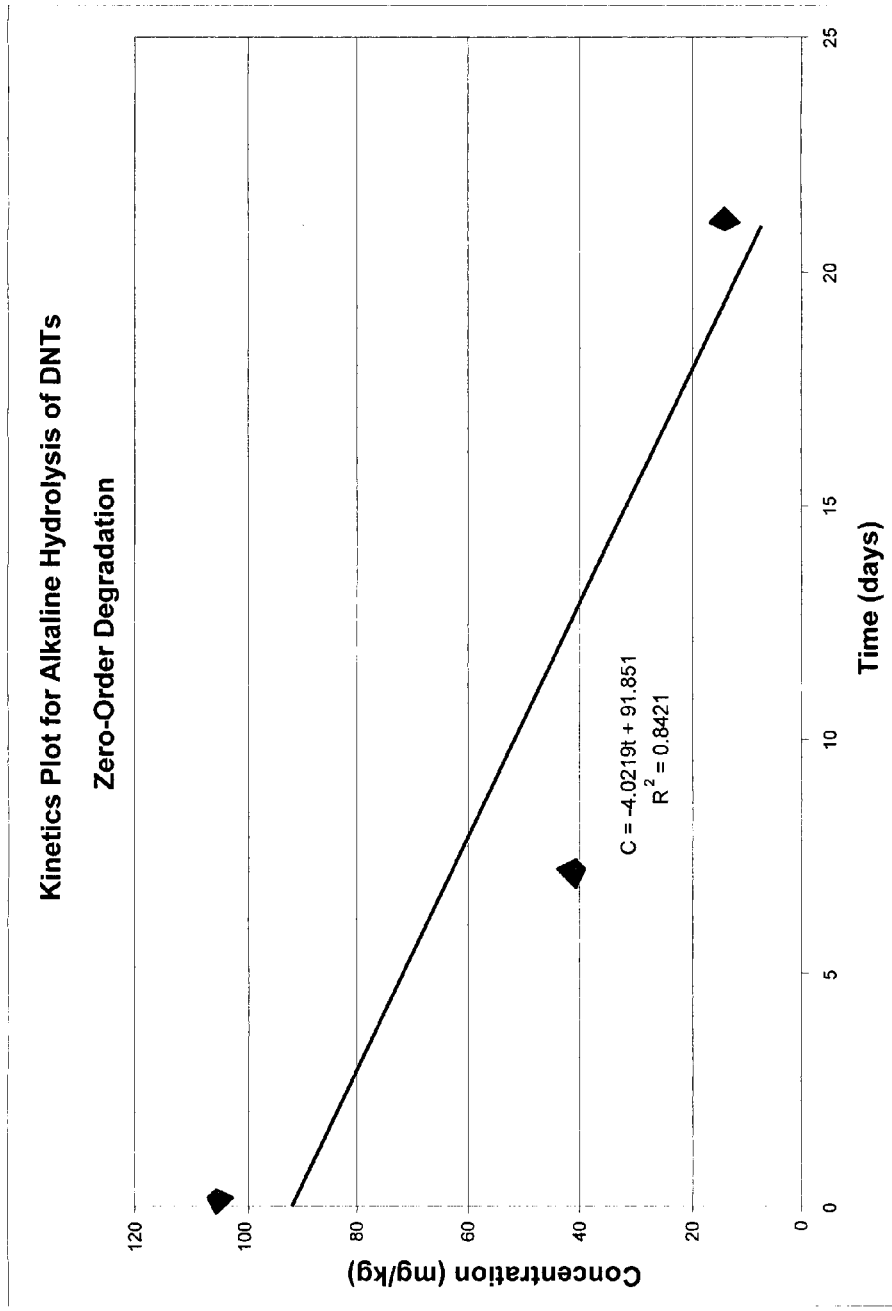
FIG. 27 shows a kinetics plot of alkaline hydrolysis of dinitrotoluene (zeroth order)
Figure 28:
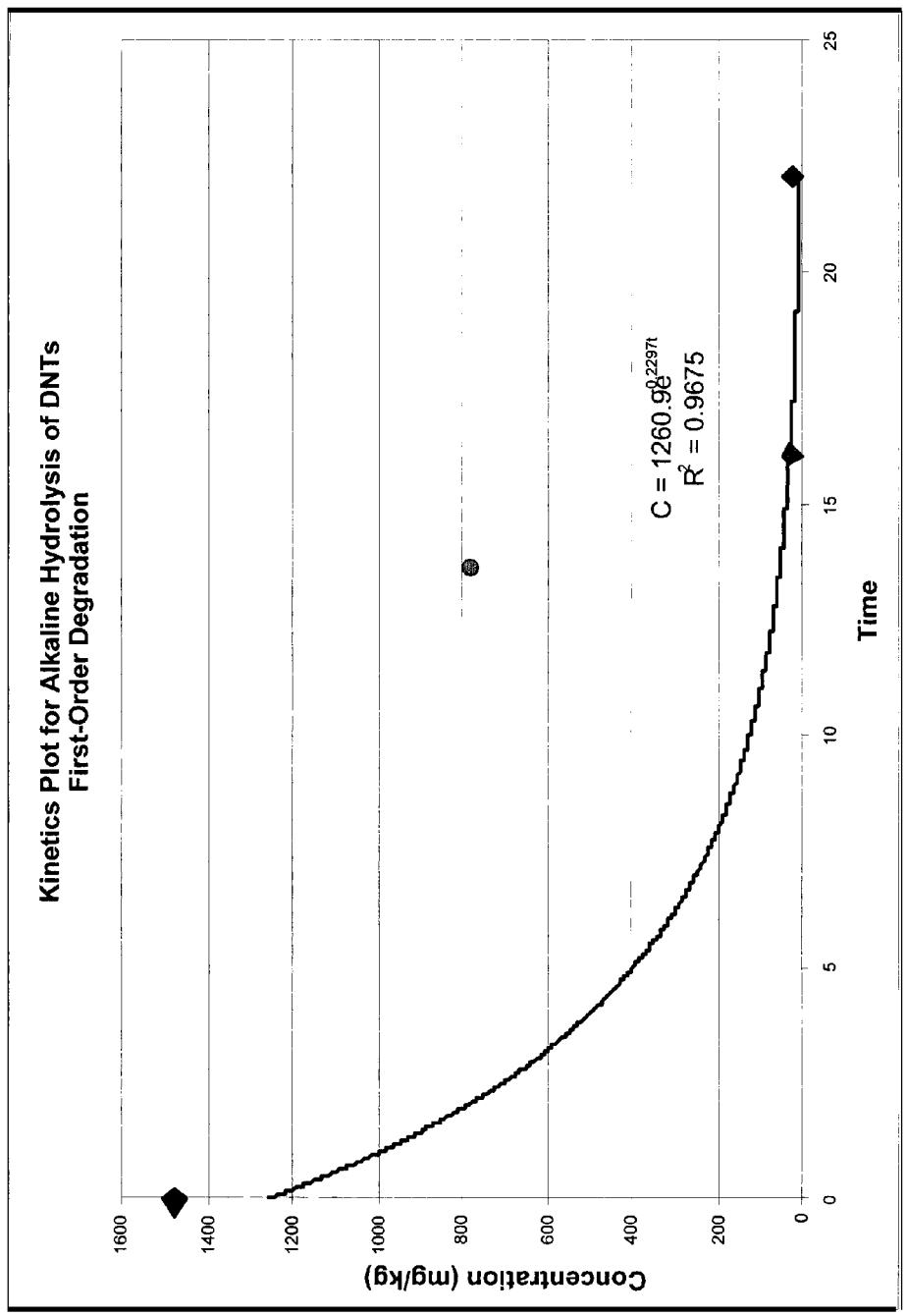
FIG. 28 shows a kinetics plot of alkaline hydrolysis of dinitrotoluene (first order)

The starting and final concentrations were used to evaluate the kinetics of treatment. Only piles that had completed explosives treatment were evaluated for kinetic purposes. Considering that data points were limited, both zeroth order and first order kinetics were applied to each treated pile to obtain approximate degradation rates. When zeroth order was applied, the degradation rate ranged from 2.069 to 58.273 $day^{-1}$, with an average rate of approximately 20.26 $day^{-1}$. FIG. 27 shows a graphical representation of this data via a zeroth order trend line. When a first order kinetic model was applied, the degradation rate ranged from 0.034 to 0.4116 $day^{-1}$, with an average rate of approximately 0.1995 $day^{-1}$. FIG. 28 shows a graphical representation of this data via a first order curve.

TABLE 8

| Building ID | Description | Groundwater Encountered | Treatment Layers (Feet BGS) | Impacted Soil Volume (CY) | DNT & TNT Mass (Pre/Post) | Status | Remarks |
| --- | --- | --- | --- | --- | --- | --- | --- |
| 801-13 | Mono-House | No | 0-20 | 393 | 127/11 | Complete | Majority excavated |
| 803-13 | Bi-House | No | 0-24 | NA | N/A | N/A | Excavated |
| 802-13 | Tri-House | N/A | N/A | N/A | N/A | N/A | Not impacted |
| Totals | | | | 393 | 127/11 | | 0.32 lbs/CY |

TABLE 9

| Building ID | Description | Groundwater Encountered | Treatment Layers (Feet BGS) | Impacted Soil Volume (CY) | DNT & TNT Mass (Pre/Post) | Status | Remarks |
| --- | --- | --- | --- | --- | --- | --- | --- |
| 812-7 (includes 357 & SL-19) | Acid Fume Recovery Unit | No | 0-5 | 1,633 | 121/25 | Complete | TCLP - 0.100 mg/L |
| | | Yes | 5-10 | 1,662 | 297/297 | Inaccessible | GW at 5 feet bgs |
| | | Yes | 10-15 | 1,651 | 203/203 | Inaccessible | |
| | | Yes | 15-20 | 1,651 | 312/312 | Inaccessible | DNT > 25 mg/kg to 28 ft; 48% to 20'; 52% 20-28' |
| Totals | | | | 6,597 | 933/837 | | 0.14 lbs/CY |

TABLE 10

| Building ID | Description | Groundwater Encountered | Treatment Layers (Feet BGS) | Impacted Soil Volume (CY) | DNT & TNT Mass (Pre/Post) | Status | Remarks |
| --- | --- | --- | --- | --- | --- | --- | --- |
| 801-14 | Mono-House | No | 0-5 | 164 | 0/0 | Removed | Layer clean |
| | | No | 5-10 | 164 | 128/— | Treatment | DNT > 25 mg/kg to 10 ft; 100% to 10' |
| Totals | | | | 328 | 128/— | | 0.39 lbs/CY |

TABLE 10-continued

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 803-14 (includes SL-18) | Bi-House | No | 0-5 | 171 | 54/— | Treatment Pending | |
| | | N/A | 5-10 | 117 | 12/— | Pending | |
| | | N/A | 10-15 | 117 | 6/— | Pending | |
| | | N/A | 15-20 | 117 | 7/— | Pending | DNT > 25 mg/kg to 44 ft; 12% to 20'; 88% 20-44' |
| Totals | | | | 522 | 79/— | | 0.15 lbs/CY |
| 802-14 | Tri-House | No | 0-7 | N/A | N/A | N/A | Excavated (E0220 & SL23) |

TABLE 11

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 801-15 (includes 230) | Mono-House | No | 0-5 | 179 | 53/1 | Complete | 2,4-DNT < 0.2 mg/kg |
| | | No | 5-10 | 876 | 1,099/— | Treatment | |
| | | N/A | 10-15 | 808 | 180/— | Pending | |
| | | N/A | 15-20 | 267 | 20/— | Pending | DNT > 25 mg/kg to 48 ft; 36% to 20'; 64% 20-48' |
| Totals | | | | 2,130 | 1,352/— | | 0.63 lbs/CY |

TABLE 12

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 803-15 (includes 358) | Bi-House | No | 0-5 | 386 | 878/— | Treatment | |
| | | N/A | 5-10 | 386 | 1,407/— | Pending | |
| | | N/A | 10-15 | 386 | 2,542/— | Pending | |
| | | N/A | 15-20 | 386 | 1,921/— | Pending | DNT > 25 mg/kg to 56 ft; 56% to 20'; 44% 20-56' |
| Totals | | | | 1,544 | 6,748/— | | 4.4 lbs/CY |

TABLE 13

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 802-15 (includes 224 and 225) | Tri-House | No | 0-5 | 157 | 462/1 | Complete | 2,4-DNT 1.8 mg/kg |
| | | Yes | 5-10 | 574 | 170/170 | Inaccessible | |
| | | Yes | 10-15 | 985 | 614/614 | Inaccessible | |
| | | Yes | 15-20 | 985 | 494/494 | Inaccessible | DNT > 25 mg/kg to 48 ft; 0.1% to 20'; 99.9% 20-48' |
| Totals | | | | 2,701 | 1,740/1,279 | | 0.64 lbs/CY |

TABLE 14

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 812-8 (includes SL19) | Acid Fume Recovery Unit | No | 0-5 | 894 | 860/— | Treatment | |
| | | Yes | 5-10 | 675 | 72/72 | Inaccessible | |
| | | Yes | 10-15 | 698 | 44/44 | Inaccessible | |
| | | Yes | 15-20 | 645 | 40/40 | Inaccessible | DNT > 25 mg/kg to 24 ft; 95% to 20'; 5% 20-24' |
| Totals | | | | 2,912 | 1,016/— | | 0.35 lbs/CY |

TABLE 15

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 801-16 (includes 239 and SL-20) | Mono-House | No | 0-5 | 315 | 253/29 | Complete | 2,4-DNT 1.5 mg/kg |
| | | No | 5-10 | 171 | 29/— | Treatment | |
| | | N/A | 10-15 | 171 | 19/— | Pending | |
| | | N/A | 15-20 | 94 | 7— | Pending | DNT > 25 mg/kg to 72 ft; 48% to 20'; 52% 20-72' |
| Totals | | | | 1,028 | 207/— | | 0.2 lbs/CY |

TABLE 16

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 803-16 (includes 238) | Bi-House | No | 0-5 | 122 | 8/4 | Complete | TCLP < 0.012 mg/L |
| | | No | 5-10 | 321 | 299/11 | Complete | Awaiting TCLP |
| | | N/A | 10-15 | 355 | 253/— | Pending | |
| | | N/A | 15-20 | 355 | 215/— | Pending | DNT > 25 mg/kg to 88 ft; 13% to 20'; 87% 20-88' |
| Totals | | | | 1,153 | 775/— | | 0.67 lbs/CY |

TABLE 17

| Building ID | Description | Groundwater Encountered | Treatment Layers (Feet BGS) | Impacted Soil Volume (CY) | DNT & TNT Mass (Pre/Post) | Status | Remarks |
|---|---|---|---|---|---|---|---|
| 802-16 (includes 235) | Tri-House | No | 0-5 | 1,632 | 2,686/— | Treatment | |
| | | N/A | 5-10 | 1,632 | 23,044/— | Pending | |
| | | N/A | 10-15 | 1,632 | 2,582/— | Pending | |
| | | N/A | 15-20 | 1,614 | 1,707/— | Pending | DNT > 25 mg/kg to 76 ft; 2% to 20'; 98% 20-76' |
| Totals | | | | 6,510 | 30,019/— | | 4.6 lbs/CY |

It was surprisingly discovered that alkaline hydrolysis in situ treatment for soil at a pH level above about 12.3 was effective for TNT and both forms of DNT regardless of the air temperature above freezing, the magnitude of contaminant concentration(s), or whether the soil was saturated with water or under-saturated. In fact, the soil tested in situ in the Project was primarily clay and, therefore, represented relatively difficult in situ treatment soil conditions.

Figure 29:
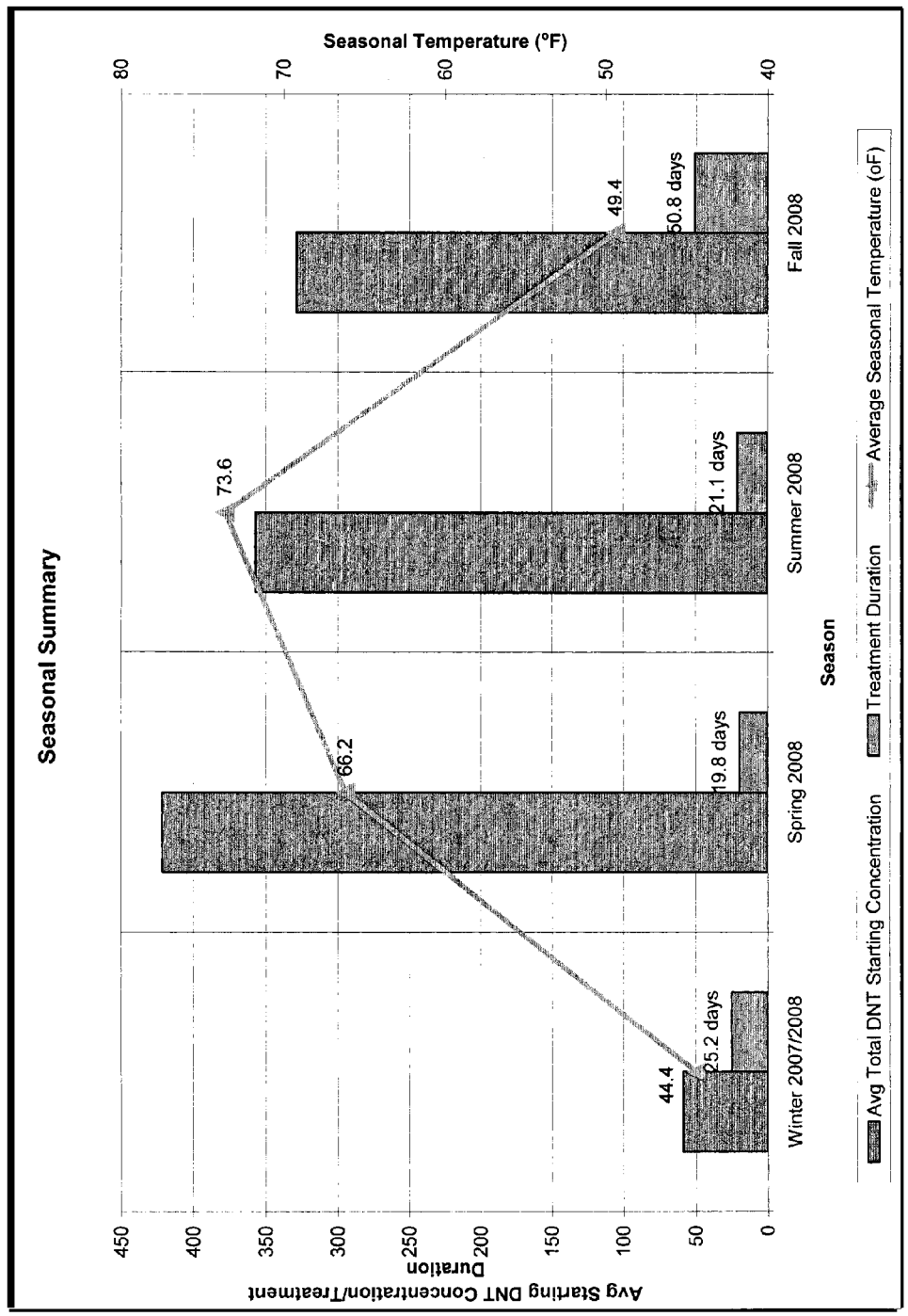
FIG. 29 shows a graph indicating the effects of varying temperatures, varying moisture content, and varying starting concentrations of contaminant(s) on alkaline hydrolysis reactions in situ.

Although the alkaline hydrolysis in situ treatment was effective at various temperatures, moisture contents, and starting concentrations of contaminant(s), there were trends associated with these various factors as shown, for example, in FIG. 29. More specifically, with regard to temperature, results showed that during the warmer months, mass removal rates were higher than colder months. Temperatures above 65° F. were considered to be "warm" months. Although successful treatment was still achieved during the colder months and this time of the year was fully utilized for continual treatment, mass removal rates decreased, which resulted in longer treatment durations. FIG. 29 indicates that treatment time is longer in winter months. Additionally, temperature could have an impact on soil mixing efficiency. Therefore, performing alkaline hydrolysis in colder regions could result in handling and mixing hurdles. At the Project site, however, recorded temperatures in the day time during the winter period are generally well above the freezing point, which caused little slowdown in mechanical implementation.

With regard to moisture content, because of the hydrolytic nature of the in situ alkaline hydroxide process, moisture addition is a key ingredient of the destructive reaction that ultimately cleans up the soil. Work at the Project sites has indicated that saturation is not necessary or desired, and that treatment progresses at a faster rate when the water is added before rather than after the dry chemicals. Results showed that to achieve successful alkaline hydrolysis treatment, the moisture content between 16% and 25% would be successful for the clay-like soil types identified at the Project sites.

Alkaline hydrolysis treatment is highly dependent on pH, with the reaction rate increasing with a higher pH. Prior to our treatment at exceedingly high pH values (i.e., greater than 12.5), the thought of in situ treatment for the types of contaminants treated in the Project were thought to be unattainable (or at least unsustainable for thorough treatment to occur). Our results revealed that TNT was amenable to chemical destruction at pHs lower than 12.1 units, which is a value that is attainable with lime addition. However, a higher pH with a stronger alkaline agent, namely sodium hydroxide, was necessary to chemically degrade DNTs. As a result, the target pH to degrade DNTs was determined to be about 12.5 or greater and high pH level at and above 12.5 were surprisingly obtained and maintained to accomplish thorough treatment of highly contaminated soil in situ—treatment resulting in contaminant levels well below target values.

Bench Scale Testing for Chlorinated Solvents

Due to the success of in situ treatment for TNT and DNT, batch tests were also conducted on chlorinated solvents (namely, polychloroethylene ["PCE"], dichloroethylene ["DCE"], and trichloroethylene ["TCE"] using soil from the Kelly AFB in January 2009. The soil was tested with lime and then with NaOH. Ferrous sulfate was used in all test runs as a catalyst. Some of the data from these tests are shown in Tables 18 and 19 below as well as in FIG. 30. There is a clear relationship between the pH level and the amount of contaminant removed from the sample(s). We saw partial success and indications of the likelihood of alkaline hydrolysis playing at least a partial role in the destruction of chlorinated solvents such as PCE and TCE. These tests are difficult to perform in the laboratory because of possible volatilization when mixing or by heat generation. We have not been able to examine this in the field yet. However, early indications are that alkaline hydrolysis could play a destructive role in the decontamination of certain chlorinated solvents.

TABLE 18

| | | Sample Results (ppb) | | | | | | |
|---|---|---|---|---|---|---|---|---|
| Test ID | Sample Date | PCE | TCE | DCE | VC | Methylene Chloride | 4-Methyl-2-Pentanone | Overall % Decrease |
| BS-1 | Jan. 8, 2009 | 12,300,000 | 8,590 J | 8,900 U | 11,000 U | 40,900 J | ND | NA |
| | Jan. 12, 2009 | 15,600,000 | 8,920 J | 8,300 U | 8,200 U | 8,800 U | ND | −26.83% |
| | Jan. 20, 2009 | 4,890,000 | 4,000 | 760 U | 950 U | 6,860 JB | ND | 60.24% |
| | Jan. 26, 2009 | 2,650,000 | 384 | 75 U | 94 U | 820 JB | 403 J | 78.46% |
| BS-2 | Jan. 8, 2009 | 7,640,000 | 6,200 U | 8,300 U | 10,000 U | 42,400 J | ND | NA |
| | Jan. 12, 2009 | 5,050,000 | 37,000 U | 40,000 U | 39,000 U | 71,000 U | ND | 33.90% |
| | Jan. 20, 2009 | 5,710,000 | 940 U | 1,300 U | 1,600 U | 6,850 JB | ND | 25.26% |
| | Jan. 26, 2009 | 141,000 | 91 U | 120 U | 150 U | 1,310 JB | ND | 98.15% |
| BS-3 | Jan. 8, 2009 | 7,270,000 | 6,210 J | 7,400 U | 9,200 U | 37,300 J | ND | NA |
| | Jan. 12, 2009 | 2,580,000 | 7,700 U | 8,200 U | 8,200 U | 15,000 U | ND | 64.51% |
| | Jan. 20, 2009 | 2,050,000 | 830 U | 1,100 U | 1,400 U | 9,030 JB | ND | 71.80% |
| | Jan. 26, 2009 | 12,400 | 82 U | 110 U | 140 U | 1,400 JB | ND | 99.83% |
| BS-4 | Jan. 8, 2009 | 5,470,000 | 6,500 U | 8,700 U | 11,000 U | 77,100 J | ND | NA |
| | Jan. 12, 2009 | 3,840,000 | 8,600 U | 9,200 U | 9,200 U | 9,800 U | ND | 29.80% |
| | Jan. 20, 2009 | 298,000 | 850 U | 1,100 U | 1,400 U | 9,070 JB | ND | 94.55% |
| | Jan. 26, 2009 | 6,840 | 93 U | 120 U | 160 U | 1,470 JB | ND | 99.87% |
| BS-5 | Jan. 8, 2009 | 5,290,000 | 6,800 U | 9,100 U | 11,000 U | 29,000 U | ND | NA |
| | Jan. 12, 2009 | 9,580,000 | 8,700 U | 9,400 U | 9,300 U | 17,000 U | ND | −81.10% |
| | Jan. 20, 2009 | 1,820,000 | 640 U | 850 U | 1,100 U | 3,450 JB | ND | 65.60% |
| | Jan. 26, 2009 | 969,000 | 90.9 J | 85 U | 110 U | 870 B | ND | 81.68% |
| BS-6 | Jan. 8, 2009 | 10,500,000 | 4,860 | 87 U | 110 U | 2,070 B | ND | NA |
| | Jan. 12, 2009 | 5,060,000 | 7,830 J | 7,500 U | 7,500 U | 8,000 U | ND | 51.81% |
| | Jan. 20, 2009 | 4,060,000 | 1,540 J | 870 U | 1,100 U | 5,850 JB | ND | 61.33% |
| | Jan. 26, 2009 | 2,070,000 | 502 | 70 U | 87 U | 909 JB | ND | 80.29% |

TABLE 19

| Test ID | Sample Date | pH (su) | Chlorides (mg/kg) | % Solids |
|---|---|---|---|---|
| BS-1 | Jan. 8, 2009 | 9.4 | 40.9 | 85.9 |
| | Jan. 12, 2009 | 8.8 | 22.3 | 82.3 |
| | Jan. 20, 2009 | 8.7 | 41.6 | 87.8 |
| | Jan. 26, 2009 | | | 91.5 |
| BS-2 | Jan. 8, 2009 | 9.2 | 42.2 | 82.3 |
| | Jan. 12, 2009 | 7.1 | 2220.0 | 86.4 |
| | Jan. 20, 2009 | 7.9 | 138.0 | 84.3 |
| | Jan. 26, 2009 | | | 89.2 |
| BS-3 | Jan. 8, 2009 | 9.1 | 40.9 | 85.3 |
| | Jan. 12, 2009 | 12.3 | 20.4 | 84.5 |
| | Jan. 20, 2009 | 12.2 | 39.5 | 79.3 |
| | Jan. 26, 2009 | | | 78.8 |
| BS-4 | Jan. 8, 2009 | 9.2 | 41.0 | 86.4 |
| | Jan. 12, 2009 | 13.4 | 208.0 | 74.6 |
| | Jan. 20, 2009 | 12.6 | 58.6 | 77.6 |
| | Jan. 26, 2009 | | | 80.8 |
| BS-5 | Jan. 8, 2009 | 9.0 | 43.0 | 81.4 |
| | Jan. 12, 2009 | 7.3 | 47.3 | 75.8 |
| | Jan. 20, 2009 | 7.8 | 64.6 | 82.9 |
| | Jan. 26, 2009 | | | 88.7 |
| BS-6 | Jan. 8, 2009 | 9.0 | 42.2 | 83.8 |
| | Jan. 12, 2009 | 8.8 | 15.6 | 80.1 |
| | Jan. 20, 2009 | 8.6 | 43.3 | 85.6 |
| | Jan. 26, 2009 | | | 89.3 |

Bench Scale test 3 ("BS-3") represents treatment of a sample with lime, reaching the pH levels shown in Table 19. The concentration of the PCE in BS-3 was reduced from 7270 mg/Kg to 12.4 mg/Kg in approximately 18 days. The overall reduction of the recalcitrant PCE was a surprising 99.83%.

Bench Scale test 4 ("BS-4") represented treatment of a sample with NaOH, reaching the pH level of 13.4 in just about four days. The concentration of PCE in BS-4 was reduced from 5470 mg/Kg to 6.84 mg/Kg in about 18 days. The overall reduction of the recalcitrant PCE was a surprising 99.87%.

Figure 30:
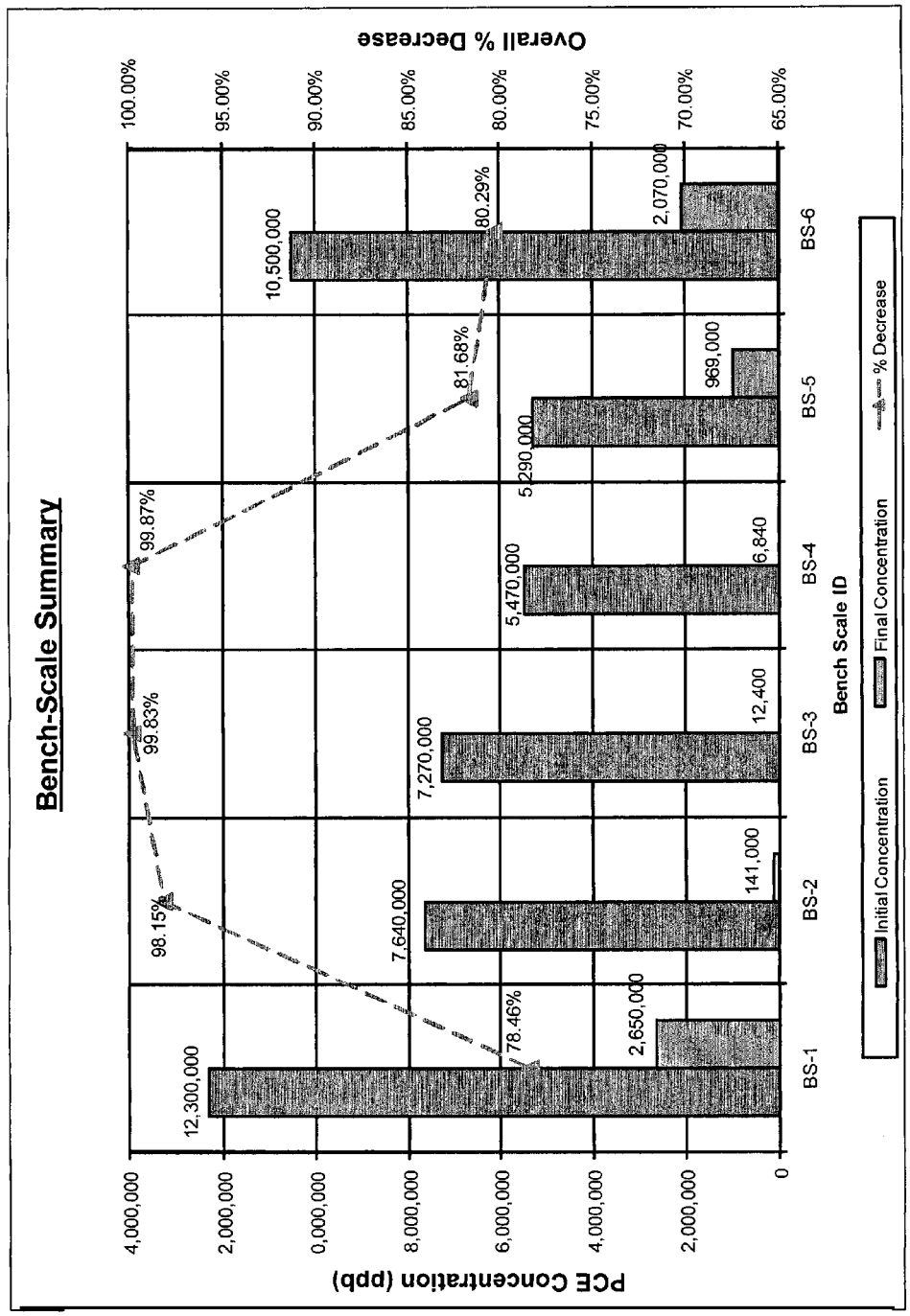
FIG. 30 shows a graph indicating treatment results from alkaline hydrolysis batch tests on chlorinated solvents.

Based on the promising results of using alkaline hydrolysis in situ with respect to the substituted nitroaromatic compounds (i.e., TNT and DNT), and further based on the promising results of alkaline hydrolysis as used the PCE batch study, the results of which are which illustrated in FIG. 30, it is reasonable to conclude that in situ alkaline hydroxide treatment using NaOH to gain elevated pH levels (i.e., pH of about 12.5 and higher) could also play a role breaking down PCE and other related chlorinated solutions into less hazardous materials.

Bench Scale Testing for RDX

Effectiveness of alkaline hydrolysis was analyzed for royal demolition explosive (RDX) in contaminated soil at the Iowa Army Ammunition Plant (IAAP). Three bench-scale studies were conducted to analyze the alkaline hydrolysis process at different pHs. Each study consisted of a soil pan with approximately 10 pounds of explosives-contaminated soil. To establish the alkaline conditions, sodium hydroxide was added in different quantities to each of the three studies to obtain varying pH values.

A baseline sample was collected prior to adding sodium hydroxide. Baseline results reported an RDX concentration of 5,640 micrograms per kilogram (μg/kg). Samples were collected from each of the three studies at 1 and 3 days after the addition of sodium hydroxide. Samples were analyzed for RDX, alkalinity, moisture content, nitrate, nitrite, and pH. Results are below in Table 20.

TABLE 20

Bench-Scale Results

|  | Baseline | Study 1 | | Study 2 | | Study 3 | |
| --- | --- | --- | --- | --- | --- | --- | --- |
|  | Date | | | | | | |
|  | Day 0 | Day 1 | Day 3 | Day 1 | Day 3 | Day 1 | Day 3 |
| RDX (μg/kg) | 5,640 | 2,590 | 4,540 | 3,350 | ND | ND | ND |
| pH | NA | 10.5 | 10 | 11.9 | 11.5 | 12.6 | 12.2 |
| Nitrate (mg/kg) | NA | 9.5 | 7.8 | 20.4 | 7.3 | 9.6 | 9.1 |
| Nitrite (mg/kg) | NA | 2.0 | 1.7 | 5.3 | 2.3 | 16.4 | 3.8 |
| Moisture Content (%) | NA | 22.8 | 24.2 | 56.8 | 25 | 21.3 | 23.7 |
| Alkalinity (mg/kg) | NA | 5,670 | NA | 50,900 | NA | 33,600 | NA |

Notes:
mg/kg = micrograms per kilogram
ND = not detected
NA = not analyzed
mg/kg = milligrams per kilogram Results revealed that after only one day of treatment, RDX was not detected in Study 3, which obtained a pH of 12.6. RDX reduction was observed in both Studies 1 and 2 (pH values of about 10.5 and about 11.9, respectively). The concentration of RDX in Study 1 was reduced to 2,590 mg/Kg after one day of treatment. The concentration of RDX in Study 2 was reduced to 3.350 mg/Kg after one day of treatment. After three days of treatment, Study 2 also reported non-detectable levels of RDX at a pH of about 11.5. These studies have clearly demonstrated the applicability of alkaline hydrolysis for RDX treatment at very high destruction rates. As with the results from our in situ results of treating substituted nitroaromatic compounds, we infer from these bench scale tests that similar in situ alkaline hydrolysis treatment for substituted heterocyclic compounds such as RDX would also be effective at reducing RDX to target concentrations.

Bench Scale Testing for Lindane (Gamma-GHC)

To further support our theory with respect to substituted heterocyclic compounds, we also tested the pesticide Lindane (gamma-GHC), another example of a substituted heterocyclic compound. The effectiveness of alkaline hydrolysis as a chemical remediation process for this common pesticide compound was simulated in the laboratory in June, 2009. Lindane (gamma-GHC) is a highly chlorinated pesticide. Three bench-scale water trials were conducted to analyze the alkaline hydrolytic process at different pH values. To establish alkaline conditions, NaOH was added in varying quantities to each of the three studies to obtain pH values of about 11, about 12, and about 13, respectively.

A baseline sample was collected prior to adding NaOH. Baseline results reported a Lindane (gamma-GHC) concentration of 260 micrograms per liter (μg/L). Approximately 24 hours after adding NaOH, a sample was collected from each of the three studies representing the different pH values. Lindane (gamma-GHC) was not detected (<0.05 μg/L) in all three trials after reactions occurred. Therefore, alkaline hydrolysis is a promising remedial treatment option for Lindane destruction at alkaline pH values.

EMBODIMENTS

In one embodiment, a method for remediating or otherwise neutralizing a medium or matrix contaminated with hazardous substances includes the steps of applying a treatment composition to a treatment zone containing a hazardous substance until the average pH of the treatment zone is greater than about 12.5 at or about at which the hazardous substance is susceptible to nucleophillic attack. The treatment composition includes from about 30% to about 100% by weight a metal hydroxide including sodium hydroxide, potassium hydroxide, or mixtures thereof. More preferably, the treatment composition includes at least about 40% by weight a metal hydroxide including sodium hydroxide, potassium hydroxide, or mixtures thereof. Most preferably, the treatment composition includes at least about 50% to about 90% by weight sodium hydroxide. The application step is successful if at least 90% by weight of the hazardous substances are broken down into less hazardous substances.

In order for alkaline hydrolysis to take place, water is necessary. However, saturation conditions are not required, and testing has shown that watering soil prior to applying treatment is sometimes preferable. A saturated condition for soil is defined herein as the condition of soil when virtually all voids between soil particles are filled with a liquid. The methods described herein work well in situations wherein at least 60% of the void space between soil particles is filled. The methods described herein will work at unsaturated conditions as low as about 40% of void spaces being filled with liquid between soil particles. The term "soil" is defined herein broadly as including sand, dirt, clay, sediment, rock, powder, dust, soot, humus, silt, or other particles commonly or scientifically referred to as "soil."

A related embodiment includes distributing a treatment composition into a treatment zone located within a treatment domain, in situ, wherein the treatment composition includes a mixture including an alkali treatment agent. The alkaline treatment agent is preferably sodium hydroxide, potassium hydroxide, or mixtures thereof. The resultant concentration from the distribution step must be sufficient to cause the treatment zone to exhibit an average pH level of at least about 11.0, more preferably at least about 11.5, still more preferably at least about 12.5, and most preferably at least about 13.0, causing the alkali treatment agent to contact the hazardous material in the treatment zone for a time and under conditions sufficient to breakdown at least about 90% of the hazardous material by an alkaline hydrolysis reaction. A treatment domain may be thought of as the entire volume of material that is contaminated or otherwise scheduled for treatment. A treatment zone may be thought of as a sub-section, a slice, or otherwise a sub-volume of the treatment domain. A treatment zone may range, for example and without limitation, from about one cubic foot to about 100 cubic feet.

The embodiments summarized above have been shown (as discussed in more detail above) to work well with substances susceptible to nucleophillic attack at the pH levels mentioned, such substances including alkanes, certain alkenes, substituted heterocyclic compounds, and substituted aromatic compounds. The nucleophillic reaction (alkaline hydrolysis) occurs especially in situations in which the leaving group of a chemical substance includes a bromide group, an iodide group, a chloride group, carboxylate group, a phosphate group, a nitrogen group, a methyl group and a sulfonic group. The substituted aromatics of trinitrotoluene ("TNT"), 2,4-dinitrotoluene (DNT1), 2,6-dinitrotoluene ("DNT2")—all well known and very popular explosives—have been demonstrated to be particularly susceptible to embodiments of the method described herein. The substituted heterocyclics royal demolition explosive ("RDX")—an explosive—and Lindane (gamma-GHC)—a very common pesticide—have been shown to be particularly susceptible to embodiments of the method described herein. Even chlorinated solvents such as polychlorinated ethylene ("PCE") show promise at the bench scale when treated using certain theory underlying the treatment methods described herein.

Various embodiments of the invention allow for the average pH of a particular treatment zone to be raised to high levels, preferably at or above a pH value of 13. At these high pH values, numerous contaminants may be neutralized or otherwise made less hazardous. Table 21 below shows the average pH value a treatment zone must typically reach before the listed contaminant is remediated. Table 21 also lists chemical species capable of raising a treatment zone to such pH values.

TABLE 21

| Reagents | Common Name | pH Attainable | Common Organic Contaminant |
|---|---|---|---|
| NaOH | Sodium hydroxide, lye | 14 | RDX, HMX, TNT minimum pH of 10.5, preferably greater than 11. |
| KOH | Potassium hydroxide, caustic potash | 13.5 | DNT requires greater than 13. CL-20 requires greater than 10.5. Alkane - Chlorinated Solvents - pH > 9.0 |
| CaO/Ca(OH)$_2$ | Calcium oxide, quicklime, calcium hydroxide, hydrated lime | 12.5 | Alkene - Chlorinated Solvents - pH > 12.0 Lindane requires a pH greater than 11. |
| CaO$_2$ | Calcium peroxide (commercial calcium peroxide comes with a 50/50 blend of pure calcium peroxide and calcium hydroxide) | 12.5 | |
| K$_2$CO$_3$/Na$_2$CO$_3$ | Potassium carbonate, carbonic acid, Potash | 11.6 | |
| Ammonia, NH$_4$(OH) - 0.1% | Ammonium Hydroxide | 10.9 | |
| Mg(OH)$_2$ | Magnesium oxide/hydroxide, milk of magnesia | 10.3 | |
| MgO$_2$ | Magnesium Peroxide | 10-11 | |
| Fly Ash | Boiler ash | 9-12 | |

An important step of in situ soil and groundwater remediation typically includes determining (as best as practicable) the chemical, biological, and physical status of the area being treated. This determination preferably includes determining the movement of groundwater using, for example, bores or wells. Core samples can be taken to determine the physical characteristics of the soil such as whether the soil is primarily made up of large grains (e.g., sandy soils) or fine grains (e.g., silt or clay). These characteristics in part determine the permeability of soil in a given treatment zone. The permeability within a zone may be similar throughout or may vary significantly depending on depth and lateral location.

The medium to be treated, typically soil, may be accessed using various technologies known to persons having ordinary skill in the art. The treatment composition, for example, may be in solid form, liquid form, gas form, or aqueous form. Preferably, the treatment composition is in aqueous form and is preferably injected into one or more treatment zones for treatment periods ranging, for example, from about three to about thirty days. Examples of injection or other accessing technologies that may be used include those taught in U.S. Pat. No. 6,398,960 to Borden et al.; U.S. Pat. No. 5,631,160 to Bruso; U.S. Pat. No. 5,626,437 to Hunt et al.; U.S. Pat. No. 7,270,499 to Greenberg; U.S. Pat. No. 7,056,060 to Abouodah; U.S. Pat. No. 6,464,005 to Ellis; U.S. Pat. No. 6,416,250 to Gilmore et al.; U.S. Pat. No. 5,908,267 to Schuring et al.; and U.S. Pat. No. 5,829,918 to Chintis, all of which are incorporated herein by reference in their entireties.

A significant advantage of the methods described herein is the use of one treatment method to treat a vast array of different types of contaminants at one site including, for example, explosives, pesticides, and dangerous solvents. Moreover, sodium hydroxide is particularly stable when stored properly unlike other substances used in similar processes (e.g., ozone and hydrogen peroxide).

The foregoing description of preferred embodiments for the present invention has been presented for purposes of illustration and description. They are not intended to be exhaustive or to limit embodiments of the invention to the precise forms disclosed. Obvious modifications or variations are possible in light of the above teachings. The embodiments are chosen and described in an effort to provide the best illustrations of the principles of the various embodiments of the invention and their practical application, and to thereby enable one of ordinary skill in the art to utilize such embodiments with various modifications as are suited to the particular use contemplated. All such modifications and variations are within the scope of the embodiments of the invention as determined by the appended claims when interpreted in accordance with the breadth to which they are fairly, legally, and equitably entitled.

What is claimed is:

1. A method of treating a medium contaminated with one or more hazardous substances, the method comprising the step of applying a treatment composition to a treatment zone containing a hazardous substance until the average pH of the treatment zone is greater than about 12.0 at or about at which the hazardous substance is susceptible to nucleophillic attack, wherein the treatment composition comprises at least about 50% by weight a metal hydroxide selected from the group consisting of sodium hydroxide and potassium hydroxide and mixtures thereof, and wherein at least 90% (wt) of the hazardous substance is broken down into less hazardous materials.

2. The method of claim 1 wherein the treatment composition essentially consists of a metal hydroxide selected from the group consisting of sodium hydroxide and potassium hydroxide and mixtures thereof.

3. The method of claim 1 wherein the hazardous substance comprises a substance selected from the group consisting of trinitrotoluene ("TNT"), 2,4-dinitrotoluene (DNT1), 2,6-dinitrotoluene ("DNT2"), royal demolition explosive ("RDX"), and Lindane (gamma-GHC).

4. The method of claim 1 wherein the hazardous substance comprises a substance selected from the group consisting of (a) one or more type of alkane; (b) one or more type of alkene; (c) one or more type of substituted aromatic substance; (d) one or more type of substituted heterocyclic substance; (e) a mixture including (a) and (b); a mixture including (a) and (c); a mixture including (a) and (d); a mixture including (b) and (c); a mixture including (b) and (d); a mixture including (c) and (d); a mixture including (a), (b), and (c); a mixture including (b), (c), and (d); a mixture including (a), (c), and (d); a mixture including (a), (b), and (d); and a mixture including (a), (b), (c), and (d).

5. The method of claim 4 wherein the one or more type of substituted aromatic substance comprises at least one functional group selected from the group consisting of a carboxylate group, a phosphate group, a nitrogen group, a methyl group and a sulfonic group.

6. The method of claim 4 wherein the one or more type of substituted heterocyclic substance comprises at least one functional group selected from the group consisting of a carboxylate group, a phosphate group, a nitrogen group, a methyl group and a sulfonic group.

7. The method of claim 5 wherein the one or more type of substituted aromatic substance is selected from the group consisting of TNT, DNT1, and DNT2.

8. The method of claim 6 wherein the one or more type of substituted heterocyclic substance is selected from the group consisting of Lindane (gamma-GHC) and RDX.

9. The method of claim 1 wherein the step of applying a treatment composition to a treatment zone containing a hazardous substance until the average pH of the treatment zone is greater than about 12.0 is extended until the average pH of the treatment zone ranges from about 12.5 to about 13.5.

10. The method of claim 1 wherein the step of applying a treatment composition to a treatment zone containing a hazardous substance until the average pH of the treatment zone is about 12.5 is prolonged until the average pH of the treatment zone is greater than or equal to about 13.0.

11. The method of claim 1 wherein the contaminated medium comprises soil.

12. A method of treating a subsurface area contaminated with hazardous material comprising distributing a treatment composition into a treatment zone located within a treatment domain, in situ, wherein the treatment composition comprises an aqueous treatment mixture at least about 50% by weight of the mixture being an alkali treatment agent selected from the group consisting of sodium hydroxide, potassium hydroxide, and mixtures thereof, wherein the resultant concentration from distribution is sufficient to cause the treatment zone to exhibit an average pH level of at least about 11.0, causing the alkali treatment agent to contact the hazardous material in the treatment zone for a time and under conditions sufficient to breakdown at least about 90% of the hazardous material by an alkaline hydrolysis reaction.

13. The method of claim 12 wherein the mixture of the treatment composition further comprises an aqueous mixture including an alkali treatment agent selected from the group consisting of sodium hydroxide, potassium hydroxide, and mixtures thereof.

14. The method of claim 12, wherein the subsurface area is selected from the group consisting of the vadose zone, the saturated zone, and the water table and one or more thereof.

15. The method of claim 12, wherein at least one of the hazardous materials in the treatment zone are susceptible to nucleophillic attack at an average pH level of at least about 11.0 and wherein the hazardous materials selected from the group consisting of (a) one or more type of alkane; (b) one or more type of alkene; (c) one or more type of substituted aromatic substance; (d) one or more type of substituted heterocyclic substance; (e) a mixture including (a) and (b); a mixture including (a) and (c); a mixture including (a) and (d); a mixture including (b) and (c); a mixture including (b) and (d); a mixture including (c) and (d); a mixture including (a), (b), and (c); a mixture including (b), (c), and (d); a mixture including (a), (c), and (d); a mixture including (a), (b), and (d); and a mixture including (a), (b), (c), and (d).

16. The method of claim 12, wherein at least one of the hazardous materials in the treatment zone are susceptible to nucleophillic attack at an average pH level of at least about 12.0 and wherein the hazardous materials selected from the group consisting of (a) one or more type of alkane; (b) one or more type of alkene; (c) one or more type of substituted aromatic substance; (d) one or more type of substituted heterocyclic substance; (e) a mixture including (a) and (b); a mixture including (a) and (c); a mixture including (a) and (d); a mixture including (b) and (c); a mixture including (b) and (d); a mixture including (c) and (d); a mixture including (a), (b), and (c); a mixture including (b), (c), and (d); a mixture including (a), (c), and (d); a mixture including (a), (b), and (d); and a mixture including (a), (b), (c), and (d).

17. The method of claim 12, wherein at least one of the hazardous materials in the treatment zone are susceptible to nucleophillic attack at an average pH level of at least about 12.5 and wherein the hazardous materials selected from the group consisting of (a) one or more type of alkane; (b) one or more type of alkene; (c) one or more type of substituted aromatic substance; (d) one or more type of substituted heterocyclic substance; (e) a mixture including (a) and (b); a mixture including (a) and (c); a mixture including (a) and (d); a mixture including (b) and (c); a mixture including (b) and (d); a mixture including (c) and (d); a mixture including (a), (b), and (c); a mixture including (b), (c), and (d); a mixture including (a), (c), and (d); a mixture including (a), (b), and (d); and a mixture including (a), (b), (c), and (d).

18. The method of claim 12, wherein at least one of the hazardous materials in the treatment zone are susceptible to nucleophillic attack at an average pH level of at least about 13.0 and wherein the hazardous materials selected from the group consisting of (a) one or more type of alkane; (b) one or more type of alkene; (c) one or more type of substituted aromatic substance; (d) one or more type of substituted heterocyclic substance; (e) a mixture including (a) and (b); a mixture including (a) and (c); a mixture including (a) and (d); a mixture including (b) and (c); a mixture including (b) and (d); a mixture including (c) and (d); a mixture including (a), (b), and (c); a mixture including (b), (c), and (d); a mixture including (a), (c), and (d); a mixture including (a), (b), and (d); and a mixture including (a), (b), (c), and (d).

19. The method of claim 13, wherein the distribution step further comprises injecting the aqueous treatment composition into the treatment zone in a manner selected from the group consisting of a vertical injection well, a horizontal injection well, a trench, and combinations thereof, if the treatment zone primarily includes saturated soil; and injecting the aqueous treatment composition into the treatment zone in a manner selected from the group consisting of mixing in place, an infiltration gallery, a vertical injection well, and combinations thereof, if the treatment zone is primarily unsaturated soil.

20. The method of claim 13, wherein the distribution step further comprises injecting the aqueous treatment composition into the treatment domain in a manner selected from the group consisting of vertical injection wells, horizontal injection wells, a trench, and combinations thereof, if the treatment zone primarily includes saturated soil; and injecting the aqueous treatment composition into the treatment domain in a manner selected from the group consisting of mixing in place, an infiltration gallery, vertical injection wells, and combinations thereof, if the treatment zone primarily includes unsaturated soil.

* * * * *